(12) United States Patent
Balakrishnan et al.

(10) Patent No.: US 10,250,450 B2
(45) Date of Patent: Apr. 2, 2019

(54) DISTRIBUTED NETWORK TROUBLESHOOTING USING SIMULTANEOUS MULTI-POINT PACKET CAPTURE

(71) Applicant: Nicira, Inc., Palo Alto, CA (US)

(72) Inventors: Neelima Balakrishnan, Santa Clara, CA (US); Ninad Ghodke, Sunnyvale, CA (US); Rishi Mehta, San Jose, CA (US); Banit Agrawal, Sunnyvale, CA (US); Ramya Bolla, Sunnyvale, CA (US); Siming Li, Palo Alto, CA (US)

(73) Assignee: NICIRA, INC., Palo Alto, CA (US)

( * ) Notice: Subject to any disclaimer, the term of this patent is extended or adjusted under 35 U.S.C. 154(b) by 75 days.

(21) Appl. No.: 15/385,569

(22) Filed: Dec. 20, 2016

(65) Prior Publication Data

US 2018/0006908 A1 Jan. 4, 2018

Related U.S. Application Data

(60) Provisional application No. 62/356,152, filed on Jun. 29, 2016.

(51) Int. Cl.
*H04L 12/26* (2006.01)
*H04L 12/24* (2006.01)
*H04L 29/06* (2006.01)

(52) U.S. Cl.
CPC .......... *H04L 41/12* (2013.01); *H04L 41/0806* (2013.01); *H04L 43/028* (2013.01); *H04L 43/0864* (2013.01); *H04L 43/12* (2013.01); *H04L 69/22* (2013.01); *H04L 2212/00* (2013.01)

(58) Field of Classification Search
CPC ... H04L 41/0806; H04L 41/12; H04L 43/028; H04L 43/0864
See application file for complete search history.

(56) References Cited

U.S. PATENT DOCUMENTS

| | | |
|---|---|---|
| 5,477,531 A | 12/1995 | McKee et al. |
| 6,515,967 B1 | 2/2003 | Wei et al. |
| 6,868,094 B1 | 3/2005 | Bordonaro et al. |
| 6,990,616 B1 | 1/2006 | Botton-Dascal et al. |
| 7,111,061 B2 | 9/2006 | Leighton et al. |
| 7,734,815 B2 | 6/2010 | Leighton et al. |
| 7,948,910 B2 | 5/2011 | Arbel et al. |
| 8,068,425 B2 | 11/2011 | Bugenhagen |
| 8,125,897 B2 | 2/2012 | Ray et al. |
| 8,199,653 B2 | 6/2012 | Bugenhagen et al. |
| 8,223,655 B2 | 7/2012 | Heinz et al. |
| 8,248,953 B2 | 8/2012 | Kumar et al. |
| 8,355,316 B1 | 1/2013 | Lushear et al. |
| 9,450,846 B1 | 9/2016 | Huang et al. |
| 10,044,583 B2 | 8/2018 | Kim et al. |
| 2003/0185210 A1 | 10/2003 | McCormack |
| 2005/0204170 A1 | 9/2005 | Belenky et al. |
| 2006/0215577 A1 | 9/2006 | Guichard et al. |

(Continued)

*Primary Examiner* — Minh Trang T Nguyen
(74) *Attorney, Agent, or Firm* — Adeli LLP

(57) ABSTRACT

Some embodiments provide a method for performing a multi-point capture of packets in a network. The method identifies multiple nodes for the multi-point capture in the network. The method configures each node of the multiple nodes to capture a set of packets. The method receives multiple captured packet sets from the multiple nodes. The method analyzes the multiple captured packet sets.

22 Claims, 17 Drawing Sheets

(56) References Cited

U.S. PATENT DOCUMENTS

| | | |
|---|---|---|
| 2007/0195707 A1 | 8/2007 | Cidon et al. |
| 2007/0258401 A1 | 11/2007 | Chan |
| 2007/0286351 A1 | 12/2007 | Ethier et al. |
| 2008/0008117 A1 | 1/2008 | Alizadeh-Shabdiz |
| 2008/0080390 A1 | 4/2008 | Ebuchi et al. |
| 2008/0253314 A1 | 10/2008 | Stephenson et al. |
| 2010/0054260 A1* | 3/2010 | Pandey ............... H04L 49/00 370/395.53 |
| 2010/0058102 A1 | 3/2010 | Li et al. |
| 2010/0332643 A1* | 12/2010 | Benari ............... G06F 9/5077 709/224 |
| 2012/0011254 A1* | 1/2012 | Jamjoom ............ G06F 9/4856 709/226 |
| 2013/0205002 A1 | 8/2013 | Wang et al. |
| 2013/0308641 A1* | 11/2013 | Ackley ............. H04L 45/7457 370/392 |
| 2014/0011455 A1 | 1/2014 | Hsu et al. |
| 2014/0052877 A1* | 2/2014 | Mao .................. H04L 61/103 709/245 |
| 2014/0215307 A1 | 7/2014 | Schneider et al. |
| 2014/0331159 A1 | 11/2014 | Hillary |
| 2015/0124826 A1 | 5/2015 | Edsall et al. |
| 2016/0127520 A1 | 5/2016 | Tewari et al. |
| 2016/0197832 A1 | 7/2016 | Barry et al. |
| 2016/0205000 A1 | 7/2016 | Zhen |
| 2016/0212021 A1 | 7/2016 | Barry et al. |
| 2017/0031599 A1 | 2/2017 | Bowman et al. |
| 2017/0054618 A1 | 2/2017 | Kim |
| 2017/0346892 A1* | 11/2017 | Bian .................. H04L 67/1076 |
| 2018/0006926 A1 | 1/2018 | Balakrishnan et al. |

* cited by examiner

①

| H(A1A3W) | A1 | A3 | W | T1 |
|---|---|---|---|---|
| H(A1A3X) | A1 | A3 | X | T1 |

1011

②

| H(A1A3W) | A1 | A3 | W | T2 |
|---|---|---|---|---|
| H(A1A3X) | A1 | A3 | X | T2 |

1012

③

| H(JKY) | IP J | IP K | Y | T3 |
|---|---|---|---|---|
| H(JLZ) | IP J | IP L | Z | T3 |
| H(A1A3W) | A1 | A3 | W | T3 |
| H(A1A3X) | A1 | A3 | X | T3 |

1013

④

| H(JKA1A3Y) | IP J | IP K | Y | T4 |
|---|---|---|---|---|
| H(A1A3W) | A1 | A3 | W | T4 |

1014

⑤

| H(JLZ) | IP J | IP L | Z | T5 |
|---|---|---|---|---|
| H(A1A3X) | A1 | A3 | X | T5 |

1015

⑥

| H(A1A3W) | A1 | A3 | W | T6 |
|---|---|---|---|---|

1016

⑦

| H(A1A3X) | A3 | X | T7 |
|---|---|---|---|

1017

⑧

| H(A1A3W) | A1 | A3 | W | T8 |
|---|---|---|---|---|
| H(A1A3X) | A1 | A3 | X | T9 |

*1511:*
| ID1 | PD1 | t1 | pay1 |
| ID2 | PD2 | t2 | pay2 |
| ID3 | PD3 | t3 | pay3 |

*1512:*
| ID1 | PD1 | t4 | pay1 |
| ID2 | PD2 | t5 | pay2 |
| ID4 | PD4 | t6 | pay4 |
| ID5 | PD5 | t7 | pay5 |
| ID6 | PD6 | t8 | pay6 |

*1513:*
| ID1 | PD1 | t9 | pay1 |
| ID4 | PD4 | t10 | pay4 |
| ID5 | PD5 | t11 | pay5 |
| ID6 | PD6 | t12 | pay6 |

*1514:*
| ID1 | PD1 | t13 | pay1 |
| ID3 | PD3 | t14 | pay3 |

*1502:*

*1511:*
| ID1 | PD1 | t1 | pay1 |
| ID2 | PD2 | t2 | pay2 |
| ID3 | PD3 | t3 | pay3 |

*1512:*
| ID1 | PD1 | t4 | pay1 |
| ID2 | PD2 | t5 | pay2 |
| ID4 | PD4 | t6 | pay4 |
| ID5 | PD5 | t7 | pay5 |
| ID6 | PD6 | t8 | pay6 |

*1513:*
| ID1 | PD1 | t9 | pay1 |
| ID4 | PD4 | t10 | pay4 |
| ID5 | PD5 | t11 | pay5 |
| ID6 | PD6 | t12 | pay6 |

*1514:*
| ID1 | PD1 | t13 | pay1 |
| ID3 | PD3 | t14 | pay3 |

DISTRIBUTED NETWORK TROUBLESHOOTING USING SIMULTANEOUS MULTI-POINT PACKET CAPTURE

BACKGROUND

Data center deployments involve a lot of networking components. Troubleshooting networking issues in such deployments requires capturing network packet traces at multiple nodes in the network/deployment. In a traditional physical network, a node can be an endpoint host, switch, router, etc. Many current methods for simultaneously collecting captures at multiple nodes of a network system are highly manual, requiring an administrator to identify nodes at which to perform a packet capture, attempt to synchronize the captures at the various nodes, and to extensively process the data to identify issues (e.g., packet drops, performance issues, packet corruptions, etc.) in the captured data for a particular situation. This makes it difficult to trace packets through the various collected captures. Some methods merge all of the captures into a single merged capture, losing much of the associated context information required for troubleshooting or generating a useful analysis.

With server virtualization in general, and network virtualization in particular, the number and type of nodes a packet traverses have increased. There are control flows as well as data flows which together determine which path a particular traffic or packet takes. Virtual switches, virtual routers, edge gateways, distributed firewalls, load-balancers, etc. are just some of the new nodes that add to the complexity of tracing traffic.

Debugging network issues in this world of virtual networking requires that captures be performed at more points in the network. With virtual networking, there might be multiple points within a single node where packet captures need to be performed. For example, in order to trace a packet through a network, it may be necessary to capture packets at a virtual switch, a virtual router, and uplinks in a single host. In addition, different nodes may be physically located in different geographic locations, requiring the synchronization and coordination of packet captures at various locations. Troubleshooting issues with nodes in a distributed network is difficult.

BRIEF SUMMARY

Some embodiments provide a method for performing a multi-point capture of packets in a network. A multi-point capture performs packet captures at multiple points (or nodes) in the network. The multi-point capture of some embodiments is initiated upon the detection of an event in the network. In some embodiments, the method monitors the network for various events (e.g., dropped packets, congested elements, etc.) and performs tests (or analyses) to identify causes and locations of the issues.

The method of some embodiments identifies a multi-point configuration of a multi-point capture to perform. In some embodiments, the multi-point configuration is received from an administrator of the network and defines a test to be run on particular entities (or nodes) within the network. The nodes include various points at which packets traversing the network can be captured. The nodes of some embodiments can be located on various different machines (e.g., a firewall appliance, an edge/gateway router, a managed forwarding element, a virtual machine, etc.), or may operate at multiple points within a single device (e.g., at different layers of a network stack operating within a single machine).

The multi-point configuration of some embodiments includes various settings to customize the multi-point capture. For example, in some embodiments, the multi-point configuration includes a session length that specifies a length for the overall capture. Some embodiments of the multi-point configuration include a packet filter that defines values for packets that should be captured by each node. A packet filter allows a node to only capture packets that are relevant to a particular test. For example, the packet filter may specify that only packets from a particular source address, that use a particular protocol, etc. are to be captured.

In some embodiments, the multi-point configuration includes a snapshot variable that specifies a portion of each packet to be captured at each node. For example, in some embodiments the payload of the packets is not relevant to a particular test (or analysis) and the snapshot variable specifies that only the header values are to be captured by the entity agents at each node.

Once the multi-point configuration has been received, the method of some embodiments then identifies several nodes in the network at which to perform the captures. In some embodiments, the nodes are identified based on the multi-point configuration and a network topology that defines the arrangement of nodes in the network. For example, in some embodiments, the method identifies all nodes between a source and destination specified in the configuration. In some embodiments, the configuration describes nodes based on a logically defined network. The network topology defines a mapping of elements of the logical network to elements in the physical network. In such embodiments, the method identifies nodes of the physical network that correspond to logical nodes of the logical network.

The method then configures each node to capture packets for the multi-point capture. In some embodiments, the method generates a node configuration for each identified node. The node configuration of some embodiments is a customized version of the multi-point configuration. In some embodiments, the node configuration is customized with node-specific properties. For example, the method of some embodiments computes a staggered start time for the node configuration of each node based on an expected round-trip time and a time skew for the node. The staggered start times allow the method to synchronize the captures performed at the different nodes.

In some embodiments, the method customizes the node configurations with a batch size based on the session length for the capture from the multi-point configuration and an amount of memory available at each node. The batch size divides the packet capture to be performed at the node into multiple batches, allowing the node to perform larger captures without overburdening the memory usage at the node.

In some embodiments, the batch size is a portion of the session length (i.e., a duration for the full capture) or a number of packets to be captured. Alternatively, or conjunctively, the batch size is determined based on an amount of available memory at each node (e.g., the captures at each node should not exceed a threshold amount or an available amount of memory should not be less than a threshold amount). In some embodiments, rather than specifying a customized batch length for each node at a central node, each individual node determines whether to divide a session length into multiple batches.

The method of some embodiments then configures each node based on the customized node configuration (e.g., limiting traffic based on a packet filter, setting a session (or batch) length, etc.). In some embodiments, the method does not generate a customized node configuration, but rather configures each node directly (e.g., through control messages, APIs, etc.).

The method then receives the captured packet groups (or packet captures) from the nodes. In some embodiments, the method receives the captured packet sets as a series of batches. The batches of some embodiments are then compiled into a single capture (or group) for each node.

In some embodiments, the method analyzes the packet groups captured at the various nodes of the network to flag potential issues (e.g., packet drops, latency issues, packet corruption, packet fragmentation, etc.). The method of some embodiments displays (e.g., in a graphical user interface (GUI)) the packet groups from the various nodes and allows a user to trace selected packets as they are captured at the different nodes of the network.

Some embodiments provide a method for analyzing packets of multiple packet groups (i.e., packets captured at each node) in a network. The packet groups of some embodiments are based on simultaneous packet captures performed at multiple nodes within a network. The method compares packets of a first packet group with packets of a second packet group, and based on the comparison, flags a set of the packets as having a set of issues. In some embodiments, the method generates identifiers that are used to identify and compare packets in the different packet groups. The identifiers of some embodiments are based on a set of immutable values (e.g., header fields of L3, L4, and/or any other higher level protocols) that should not change for a packet between the ends of an analysis and should uniquely identify the packet at each node.

In some embodiments, packets become modified (e.g., encapsulated, fragmented, etc.) as they traverse the network. In order to identify the modified packets, the method of some embodiments performs a multi-pass analysis of the packet groups to generate multiple identifiers for the different packets. In some such embodiments, the method generates a first identifier (e.g., a hash value) for each packet in the packet groups.

The method then generates a second identifier based on other immutable values for each packet. The second identifier of some embodiments is based on immutable values of a different portion of the packet (e.g., inner encapsulated packet headers, rather than outer encapsulating headers) or based on a reassembled packet (e.g., in the case of fragmented packets). In some embodiments, the second identifier also uniquely identifies the particular packet within each of the packet groups. The first and second identifiers can then be used to identify corresponding packets between the different packet groups. The method of some embodiments generates a third identifier, similar to the second identifier, to identify another set of corresponding packets in the packet groups. In some embodiments, the second and third identifiers identify encapsulated packets and fragmented packets.

When the immutable data (e.g., header values) that is used to identify the packets is corrupted, the packet cannot be matched with corresponding packets in the other packet groups. In some embodiments, the method performs a preliminary check on the packet data in the packet groups to eliminate any corrupted headers and to flag the packets with the corrupted headers as being corrupted. The preliminary check of some embodiments verifies the validity of values in header fields of the packet based on allowed values for the different header fields according to a protocol specified for the packet. The method flags packets with invalid values as corrupted. For example, a packet with a particular header field that contains a value outside of an allowed range for the particular header field could be flagged as corrupted. In some embodiments, the flagged packet is removed from further analysis of the packet groups.

The method of some embodiments analyzes the packet groups based on an ordering of the packet groups in the network (e.g., based on a path of the packets through the network). For example, since the different packet groups are captured at different points in the network, the method of some embodiments compares the packets of a first packet group (earlier along the path) with the packets of a later second packet group. Corresponding packets in the different groups may be identified using the first and/or second identifiers.

In some embodiments, even though the header values for a packet may all be valid values, the packet may still be corrupted. When the immutable values of a packet become corrupted, the identifiers will no longer match with the original packet and will appear as a "new" packet. When the method determines that a particular packet, which is not in an earlier packet group, "appears" in a downstream packet group, the method of some embodiments flags the packet as a corrupted packet.

The method of some embodiments performs various different analyses to flag other issues with packets in the packet groups. For example, when the method determines that a packet that was in the first packet group is not in the second packet group, the method flags the packet as being dropped. In some embodiments, when the method that the first and second identifiers indicate that a packet has become fragmented (e.g., a first identifier for a particular packet matches with a second identifier for a reassembled packet), the method flags the packet as being fragmented.

In addition to determining whether packets are identified in the different packet groups, the method of some embodiments evaluates the time it takes for a packet to be captured at the different nodes in the different packet groups. For example, in some embodiments, the method compares a capture time for a packet at a first packet group with a capture time for the packet at a subsequent second packet group. When the difference between the times is beyond a particular threshold, the packets (or the nodes, or the path between the nodes) are marked as having high latency.

In order to reliably use the capture times of the different packet groups, the method of some embodiments adjusts the time data for the packet groups based on a time skew value computed for each node. The time skew value of some embodiments is computed based on the clocks at the various nodes, as well as a statistical analysis of round-trip times for several packets exchanged with the particular node. The method of some embodiments uses the calculated skew value to synchronize the time data for each node and to get a more accurate view of the latency times for packets traveling between the nodes.

In some embodiments, the method displays the multiple packet groups in order to identify the packets with the flagged issues. For example, when a packet is flagged as being dropped, the method of some embodiments highlights the packet in the latest group in which the packet was identified. When a packet is flagged as being corrupted, the method of some embodiments highlights the packet in the last group in which the packet was not corrupted, as well as in the first group in which the corruption was detected. In some embodiments, in addition to the packets that are flagged with a particular issue, the method displays a set of reports that identify nodes (e.g., ports, network stack layers, routers, etc.) that have a high latency or a high frequency of issues.

The method of some embodiments, provides a user interface for analyzing captured multi-point packet groups. In some embodiments, the method displays the multiple packet groups and, upon selection of a target packet in a first packet group, identifies the corresponding packets in the other packet groups. The method of some embodiments identifies the corresponding set of packets based on the first and second identifiers. The method of some embodiments displays the target packet and the corresponding packets with a different appearance (e.g., highlighting, different colors, etc.) from other packets in each packet group. In some embodiments, the method provides different visualizations of the packet groups (e.g., a graph, a chart, a table, etc.) that allow a user to quickly identify issues in the network and/or to trace packets through the packet groups.

In some embodiments, the corresponding packets include encapsulated versions of the target packet. For example, in some embodiments a packet is tunneled between different points along a path through the network. The tunneled packets include additional encapsulating headers around the target packet that are used to send the target packet through tunnels of the network. In some embodiments, the corresponding packets include fragmented packets of the target packet. As a packet traverses the network, a packet may be fragmented (or segmented) into smaller packets (or segments). The method of some embodiments reassembles the fragmented packets into a reassembled packet and identifies the fragmented packets as corresponding packets for the target packet.

The preceding Summary is intended to serve as a brief introduction to some embodiments of the invention. It is not meant to be an introduction or overview of all of the inventive subject matter disclosed in this document. The Detailed Description that follows and the Drawings that are referred to in the Detailed Description will further describe the embodiments described in the Summary as well as other embodiments. Accordingly, to understand all the embodiments described by this document, a full review of the Summary, Detailed Description and the Drawings is needed. Moreover, the claimed subject matters are not to be limited by the illustrative details in the Summary, Detailed Description and the Drawing, but rather are to be defined by the appended claims, because the claimed subject matters can be embodied in other specific forms without departing from the spirit of the subject matters.

BRIEF DESCRIPTION OF THE DRAWINGS

The novel features of the invention are set forth in the appended claims. However, for purposes of explanation, several embodiments of the invention are set forth in the following figures.

FIGS. 10A-B illustrate an example of packet captures from the various points of the network system of FIG. 9.

FIG. 15 illustrates an example of a GUI for displaying multiple packet capture groups.

DETAILED DESCRIPTION OF THE INVENTION

Figure 1:
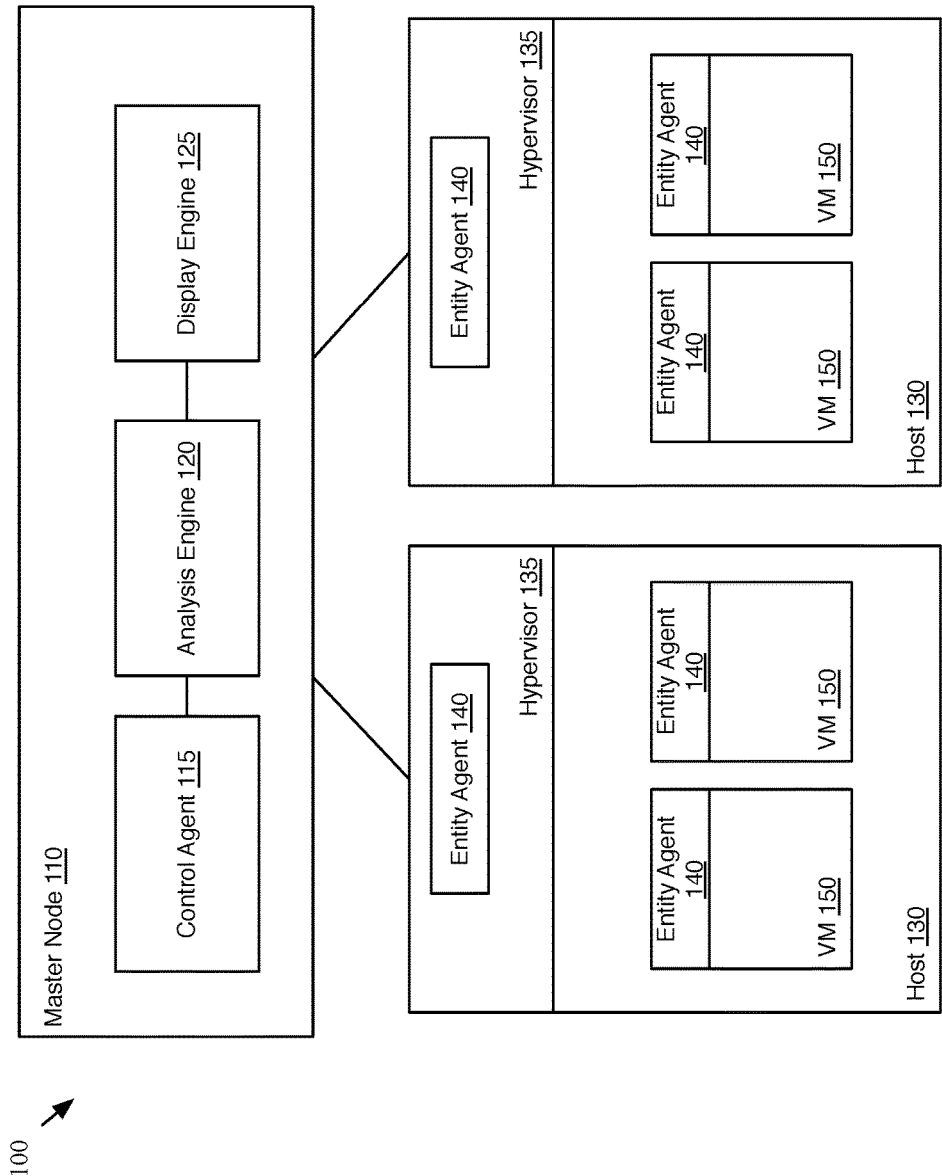
FIG. 1 illustrates an example of a system for performing a multi-point packet capture and analysis.

In the following detailed description of the invention, numerous details, examples, and embodiments of the invention are set forth and described. However, it should be understood that the invention is not limited to the embodiments set forth and that the invention may be practiced without some of the specific details and examples discussed.

Some embodiments provide a method for performing a multi-point capture of packets in a network. A multi-point capture performs packet captures at multiple points (or nodes) in the network. The multi-point capture of some embodiments is initiated upon the detection of an event in the network. In some embodiments, the method monitors the network for various events (e.g., dropped packets, congested elements, etc.) and performs tests (or analyses) to identify causes and locations of the issues.

The method of some embodiments identifies a multi-point configuration of a multi-point capture to perform. In some embodiments, the multi-point configuration is received from an administrator of the network and defines a test to be run on particular entities (or nodes) within the network. The nodes include various points at which packets traversing the network can be captured. The nodes of some embodiments can be located on various different machines (e.g., a firewall appliance, an edge/gateway router, a managed forwarding element, a virtual machine, etc.), or may operate at multiple points within a single device (e.g., at different layers of a network stack operating within a single machine).

The multi-point configuration of some embodiments includes various settings to customize the multi-point capture. For example, in some embodiments, the multi-point configuration includes a session length that specifies a length for the overall capture. Some embodiments of the multi-point configuration include a packet filter that defines values for packets that should be captured by each node. A packet filter allows a node to only capture packets that are relevant to a particular test. For example, the packet filter may specify that only packets from a particular source address, that use a particular protocol, etc. are to be captured.

In some embodiments, the multi-point configuration includes a snapshot variable that specifies a portion of each packet to be captured at each node. For example, in some embodiments the payload of the packets is not relevant to a particular test (or analysis) and the snapshot variable specifies that only the header values are to be captured by the entity agents at each node.

Once the multi-point configuration has been received, the method of some embodiments then identifies several nodes in the network at which to perform the captures. In some embodiments, the nodes are identified based on the multi-point configuration and a network topology that defines the arrangement of nodes in the network. For example, in some embodiments, the method identifies all nodes between a source and destination specified in the configuration. In some embodiments, the configuration describes nodes based on a logically defined network. The network topology defines a mapping of elements of the logical network to elements in the physical network. In such embodiments, the method identifies nodes of the physical network that correspond to logical nodes of the logical network.

The method then configures each node to capture packets for the multi-point capture. In some embodiments, the method generates a node configuration for each identified node. The node configuration of some embodiments is a customized version of the multi-point configuration. In some embodiments, the node configuration is customized with node-specific properties. For example, the method of some embodiments computes a staggered start time for the node configuration of each node based on an expected round-trip time and a time skew for the node. The staggered start times allow the method to synchronize the captures performed at the different nodes.

In some embodiments, the method customizes the node configurations with a batch size based on the session length for the capture from the multi-point configuration and an amount of memory available at each node. The batch size divides the packet capture to be performed at the node into multiple batches, allowing the node to perform larger captures without overburdening the memory usage at the node.

In some embodiments, the batch size is a portion of the session length (i.e., a duration for the full capture) or a number of packets to be captured. Alternatively, or conjunctively, the batch size is determined based on an amount of available memory at each node (e.g., the captures at each node should not exceed a threshold amount or an available amount of memory should not be less than a threshold amount). In some embodiments, rather than specifying a customized batch length for each node at a central node, each individual node determines whether to divide a session length into multiple batches.

The method of some embodiments then configures each node based on the customized node configuration (e.g., limiting traffic based on a packet filter, setting a session (or batch) length, etc.). In some embodiments, the method does not generate a customized node configuration, but rather configures each node directly (e.g., through control messages, APIs, etc.).

The method then receives the captured packet groups (or packet captures) from the nodes. In some embodiments, the method receives the captured packet sets as a series of batches. The batches of some embodiments are then compiled into a single capture (or group) for each node.

In some embodiments, the method analyzes the packet groups captured at the various nodes of the network to flag potential issues (e.g., packet drops, latency issues, packet corruption, packet fragmentation, etc.). The method of some embodiments displays (e.g., in a graphical user interface (GUI)) the packet groups from the various nodes and allows a user to trace selected packets as they are captured at the different nodes of the network.

Some embodiments provide a method for analyzing packets of multiple packet groups (i.e., packets captured at each node) in a network. The packet groups of some embodiments are based on simultaneous packet captures performed at multiple nodes within a network. The method compares packets of a first packet group with packets of a second packet group, and based on the comparison, flags a set of the packets as having a set of issues. In some embodiments, the method generates identifiers that are used to identify and compare packets in the different packet groups. The identifiers of some embodiments are based on a set of immutable values (e.g., header fields of L3, L4, and/or any other higher level protocols) that should not change for a packet between the ends of an analysis and should uniquely identify the packet at each node.

In some embodiments, packets become modified (e.g., encapsulated, fragmented, etc.) as they traverse the network. In order to identify the modified packets, the method of some embodiments performs a multi-pass analysis of the packet groups to generate multiple identifiers for the different packets. In some such embodiments, the method generates a first identifier (e.g., a hash value) for each packet in the packet groups.

The method then generates a second identifier based on other immutable values for each packet. The second identifier of some embodiments is based on immutable values of a different portion of the packet (e.g., inner encapsulated packet headers, rather than outer encapsulating headers) or based on a reassembled packet (e.g., in the case of fragmented packets). In some embodiments, the second identifier also uniquely identifies the particular packet within each of the packet groups. The first and second identifiers can then be used to identify corresponding packets between the different packet groups. The method of some embodiments generates a third identifier, similar to the second identifier, to identify another set of corresponding packets in the packet groups. In some embodiments, the second and third identifiers identify encapsulated packets and fragmented packets.

When the immutable data (e.g., header values) that is used to identify the packets is corrupted, the packet cannot be matched with corresponding packets in the other packet groups. In some embodiments, the method performs a preliminary check on the packet data in the packet groups to eliminate any corrupted headers and to flag the packets with the corrupted headers as being corrupted. The preliminary check of some embodiments verifies the validity of values in header fields of the packet based on allowed values for the different header fields according to a protocol specified for the packet. The method flags packets with invalid values as corrupted. For example, a packet with a particular header field that contains a value outside of an allowed range for the particular header field could be flagged as corrupted. In some embodiments, the flagged packet is removed from further analysis of the packet groups.

The method of some embodiments analyzes the packet groups based on an ordering of the packet groups in the network (e.g., based on a path of the packets through the network). For example, since the different packet groups are captured at different points in the network, the method of some embodiments compares the packets of a first packet group (earlier along the path) with the packets of a later second packet group. Corresponding packets in the different groups may be identified using the first and/or second identifiers.

In some embodiments, even though the header values for a packet may all be valid values, the packet may still be corrupted. When the immutable values of a packet become corrupted, the identifiers will no longer match with the original packet and will appear as a "new" packet. When the method determines that a particular packet, which is not in an earlier packet group, "appears" in a downstream packet group, the method of some embodiments flags the packet as a corrupted packet.

The method of some embodiments performs various different analyses to flag other issues with packets in the packet groups. For example, when the method determines that a packet that was in the first packet group is not in the second packet group, the method flags the packet as being dropped. In some embodiments, when the method that the first and second identifiers indicate that a packet has become fragmented (e.g., a first identifier for a particular packet matches with a second identifier for a reassembled packet), the method flags the packet as being fragmented.

In addition to determining whether packets are identified in the different packet groups, the method of some embodiments evaluates the time it takes for a packet to be captured at the different nodes in the different packet groups. For example, in some embodiments, the method compares a capture time for a packet at a first packet group with a capture time for the packet at a subsequent second packet group. When the difference between the times is beyond a particular threshold, the packets (or the nodes, or the path between the nodes) are marked as having high latency.

In order to reliably use the capture times of the different packet groups, the method of some embodiments adjusts the time data for the packet groups based on a time skew value computed for each node. The time skew value of some embodiments is computed based on the clocks at the various nodes, as well as a statistical analysis of round-trip times for several packets exchanged with the particular node. The method of some embodiments uses the calculated skew value to synchronize the time data for each node and to get a more accurate view of the latency times for packets traveling between the nodes.

In some embodiments, the method displays the multiple packet groups in order to identify the packets with the flagged issues. For example, when a packet is flagged as being dropped, the method of some embodiments highlights the packet in the latest group in which the packet was identified. When a packet is flagged as being corrupted, the method of some embodiments highlights the packet in the last group in which the packet was not corrupted, as well as in the first group in which the corruption was detected. In some embodiments, in addition to the packets that are flagged with a particular issue, the method displays a set of reports that identify nodes (e.g., ports, network stack layers, routers, etc.) that have a high latency or a high frequency of issues.

The method of some embodiments, provides a user interface for analyzing captured multi-point packet groups. In some embodiments, the method displays the multiple packet groups and, upon selection of a target packet in a first packet group, identifies the corresponding packets in the other packet groups. The method of some embodiments identifies the corresponding set of packets based on the first and second identifiers. The method of some embodiments displays the target packet and the corresponding packets with a different appearance (e.g., highlighting, different colors, etc.) from other packets in each packet group. In some embodiments, the method provides different visualizations of the packet groups (e.g., a graph, a chart, a table, etc.) that allow a user to quickly identify issues in the network and/or to trace packets through the packet groups.

In some embodiments, the corresponding packets include encapsulated versions of the target packet. For example, in some embodiments a packet is tunneled between different points along a path through the network. The tunneled packets include additional encapsulating headers around the target packet that are used to send the target packet through tunnels of the network. In some embodiments, the corresponding packets include fragmented packets of the target packet. As a packet traverses the network, a packet may be fragmented (or segmented) into smaller packets (or segments). The method of some embodiments reassembles the fragmented packets into a reassembled packet and identifies the fragmented packets as corresponding packets for the target packet.

An overview of the process for troubleshooting a distributed network using multi-point capture analysis has been described above. Further details and examples of the multi-point capture and analysis are described below. Specifically, Section I describes a distributed network environment for performing a multi-point packet capture and analysis. Section II describes examples for performing a simultaneous multi-point packet capture at various nodes in a network system. Section III then describes examples of analyzing and displaying the multi-point packet captures. Finally, section IV describes an electronic system with which some embodiments of the invention are implemented.

I. Distributed Network System

FIG. 1 illustrates an example of a system for performing a multi-point packet capture and analysis. The network system 100 includes a master node 110 and two hosts 130. The master node of some embodiments is a central node that manages the operation of several entity agents on nodes (e.g., host machines, hypervisors, operating systems, forwarding elements, etc.) in the network. Hosts 130 execute a hypervisor 135 to virtualize physical resources of the host machines 130. VMs 150 operate on the virtualized resources provided by the hypervisors 135 of the host machines 130.

Master node 110 of some embodiments performs multi-point captures by managing and configuring entity agents that operate at capture nodes (points in the network at which captures are performed) in the network. In some embodiments, the system includes multiple master nodes for managing the capture nodes of the network system. Master node 110 includes a control agent 115, an analysis engine 120, and a display engine 125.

Control agent 115 communicates (e.g., via secure shell (SSH)) with the different entity agents at capture nodes in the network. In some embodiments, control agent 115 also provides a user interface (UI) to allow a user (e.g., a network administrator) to configure and initiate a multi-point packet capture and analysis. Control agent 115 of some embodiments uses a multi-point configuration for a multi-point capture to generate customized node configurations for each entity agent 140. In some embodiments, control agent 115 configures the entity agents operating at multiple points in the network to synchronize packet captures performed at the different points. Control agent 115 of some embodiments then collects the captures (or captured packet groups) performed at the different nodes.

Analysis engine 120 analyzes the various captured packet groups to identify problems and/or allow the user to analyze packet traffic in the network. Analysis engine 120 of some embodiments flags issues to be presented in logs or to trigger events that initiate additional analyses in the network. In some embodiments, analysis engine 120 compares the packets of a first packet group (earlier along the path) with the packets of a later second packet group to perform the analyses. Corresponding packets in the different groups may be identified using different sets of identifiers.

Display engine 125 provides a visual display of packets to assist a user in troubleshooting the network. In some embodiments, the display engine 125 displays problems identified by the analysis engine and/or allows a user to view captured packets as they are traverse the various nodes the network.

Entity agents, which are managed by the master node to perform the packet captures, may operate at various entities (e.g., host machines, firewall appliances, hypervisors, managed switching elements, operating systems, etc.) in the network. In this example, master node 110 manages entity agents 140 that operate within hosts 130. More specifically, entity agents 140 operate at the hypervisors 135, as well as within each VM 150. In some embodiments, the hypervisor 135 provides a virtual switch, and the entity agent 140 on the hypervisor 135 is for capturing packets as they traverse the virtual switch.

Entity agents 140 operate at various points (or nodes) in the network. The nodes include various points at which packets traversing the network can be captured. The nodes of some embodiments can be located on various different entities (e.g., a firewall appliance, an edge/gateway router, a managed forwarding element, a virtual machine, etc.), or may operate at different points within a single device (e.g., at different layers of a network stack operating within a single machine).

Each entity agent 140 communicates with a control agent 115 of a master node 110 to perform packet captures and to return the captured packet groups to the master node 110. The entity agents 140 of some embodiments are user space applications that communicate with the control agent 115 of the master node 110 and perform captures by executing scripts at each node identified for a multi-point capture. Entity agent 140 of some embodiments receives, from control agent 115, customized configuration information that defines a capture (e.g., what to capture, when to capture it, etc.) to be performed by each specific entity agent.

In some embodiments, the control agent 115 receives a configuration for a multi-point capture based on logical forwarding elements of a logical network, which are implemented on physical elements of a physical network. Control agent 115, using a topology of the logical network that maps the logical elements to physical elements of the physical network, configures entity agents at the corresponding physical elements to implement the multi-point capture.

The multi-point capture can be flexibly performed on many network systems with minimal changes required at each node. By centralizing control at the master node(s) and distributing configurations for the multi-point capture to distributed entity agents, neither the participating nodes/entities nor the packets themselves need to be specially configured to perform the packet captures. There are no dependencies on specific protocols for controls or for implementing software defined networks (SDNs). As the entity agents capture existing traffic through the various nodes, the control and entity agents can be implemented on already existing production deployments.

In some embodiments, the multi-point captures are defined and performed for logical networks that are implemented on various elements of a physical network. A logical network logically connects a set of end machines (e.g., virtual machines, physical servers, containers, etc.) and a set of physical machines (and other resources of the physical network) using a set of logical forwarding elements (e.g., logical L2 and L3 switches). This allows the physical resources of a physical network to be allocated and shared while maintaining a logical separation between the end machines of the different logical networks.

Debugging network issues in this world of virtual networking requires that captures be performed at more places to determine the source of packet drops, performance issues and packet corruptions. With virtual networking, packet captures may need to be performed at multiple points within a single node. For example, in order to trace a packet, it may be necessary to capture packets at the virtual switch, at a virtual router, and at uplinks in a single host.

Figure 2:
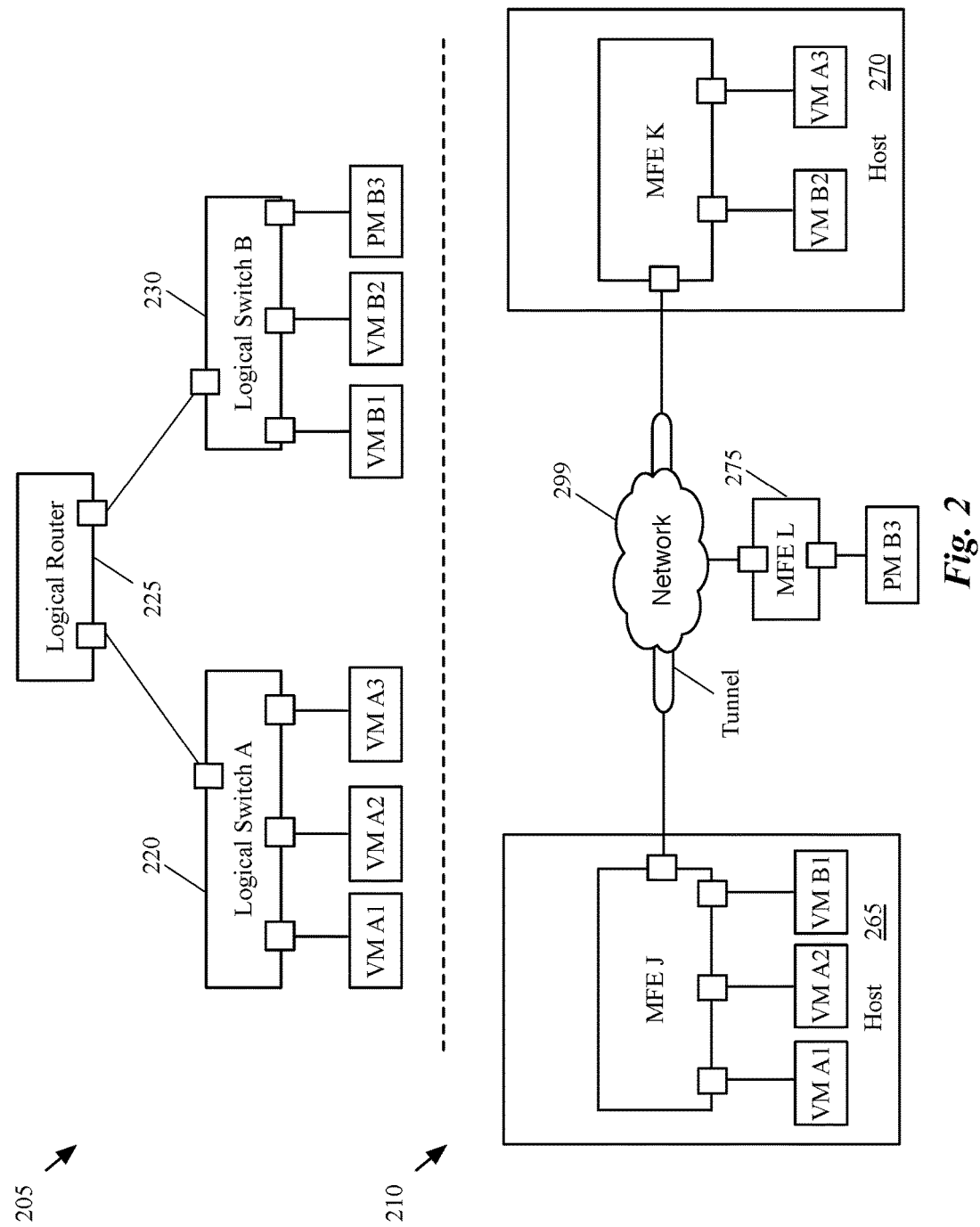
FIG. 2 illustrates an example of a logical forwarding element of a logical network that is implemented on physical elements of a physical network.

FIG. 2 illustrates an example of a logical network that is implemented on a physical network. This figure shows end machines (VMs 1-4 and PM5) that are logically connected according to a logical network 200, while being physically connected according to a physical network 205.

The logical network 200 includes three logical forwarding elements (a logical router 225 and two logical switches 220 and 230) that describe the desired forwarding behaviors for the end machines VMs 1-4 in the logical network. In some embodiments, the virtual machines VMs 1-4 operate on virtualization software that executes on the host machines. Specifically, VMs 1 and 2 are connected through logical ports to a first logical switch 220. VMs 3 and 4 and physical machine PM 5 is connected through logical ports of a second logical switch 230. The two logical switches 220 and 230 are connected to ports of a logical router 225.

The physical network 205 shows the actual physical connections between the end machines VMs 1-4 and PM 5. Physical network 205 shows two hosts 265 and 270. The hosts 265 and 270 have MSFEs 255 and 260, which connect to VMs 1 and 3, and VMs 2 and 4, respectively. Physical network 205 also shows a MHFE (a hardware forwarding element) and a physical machine PM5 (e.g., server, baremetal machine, etc.) that is attached to a physical port of the WIFE 275. The MSFEs 255 and 260 and the MHFE 275 are connected to each other by tunnels through a network 299. The connections of the end machines to the logical switches as well as the connections of the logical switches to the logical router are defined using logical ports, which are mapped to the physical ports of the MSFEs 255 and 260 and of the MHFE 275.

The connections in the logical network differ from the connections of the physical network. For example, although end machines VMs 3 and 4 and PM 5 are connected to a single logical switch 225 in the logical network 200, they are all physically connected to different managed forwarding elements in the physical network 205. The MFEs (i.e., MSFEs and MHFEs) could reside in different machines, different subnets, or even different datacenters in different parts of the world. The MFEs implement the logical network by creating tunnels for communicating logical network data to other forwarding elements.

The network control system of some embodiments configures the forwarding elements of the physical network to implement the logical forwarding elements of the logical network by creating tunnels and modifying forwarding behaviors of the managed forwarding elements. In some embodiments, the MSFEs 255 and 260 and the MHFE 265 of the physical network implement the LFEs 220-230 through a set of flow entries for routing the packets of the logical network. Alternatively, or conjunctively, some or all of the managed forwarding elements are not flow-based software forwarding elements, but instead process packets based on configuration data that is generated by their respective local controllers.

Although, in the illustrated example, each managed forwarding element implements logical forwarding elements for a single logical network, in some embodiments, a managed forwarding element may be attached to machines for logical forwarding elements of different logical network. A single managed forwarding element can be configured to implement different logical networks for different tenants.

II. Simultaneous Multi-Point Packet Capture

Performing packet captures at multiple points in a network is difficult and often raises numerous problems. Many current methods for simultaneously collecting captures at multiple nodes of a network system are highly manual, requiring an administrator to identify nodes at which to perform a packet capture, attempt to synchronize the captures at the various nodes, and to extensively process the data to identify issues (e.g., packet drops, performance issues, packet corruptions, etc.) in the captured data for a particular situation. Such methods require that the correct nodes be identified and that each node be set up correctly (e.g., with the correct filters, starting at a correct time, etc.). In addition, in some cases, different nodes may have different capabilities (e.g., different amounts of memory) and processing loads, giving rise to other potential problems. For example, storage limits of a particular node can cause packet captures to overrun, losing important information. In order to have a complete picture of the captured packets through the network, when some of the captures fail, it may require that all of the captures have to be re-done. These problems lead to the loss of critical data, wasted time in capturing packet traces, and the misdiagnosis of errors.

In addition to identifying the correct nodes and configuring each node correctly, it is also difficult to synchronize the captures at the various nodes. Clocks at the different network elements may differ from each other (e.g., time skew), so initiating packet captures at the nodes at the same time becomes difficult. By not synchronizing the captures at the different devices, a multi-point capture has to be longer in order to ensure that all of the relevant packets are captured across all the nodes along a path. In addition, the time skews also make it difficult to compare the packet captures at the different nodes. The central control agent of some embodiments allows a multi-point capture to be performed reliably and synchronously across multiple nodes in a network.

Figure 3:
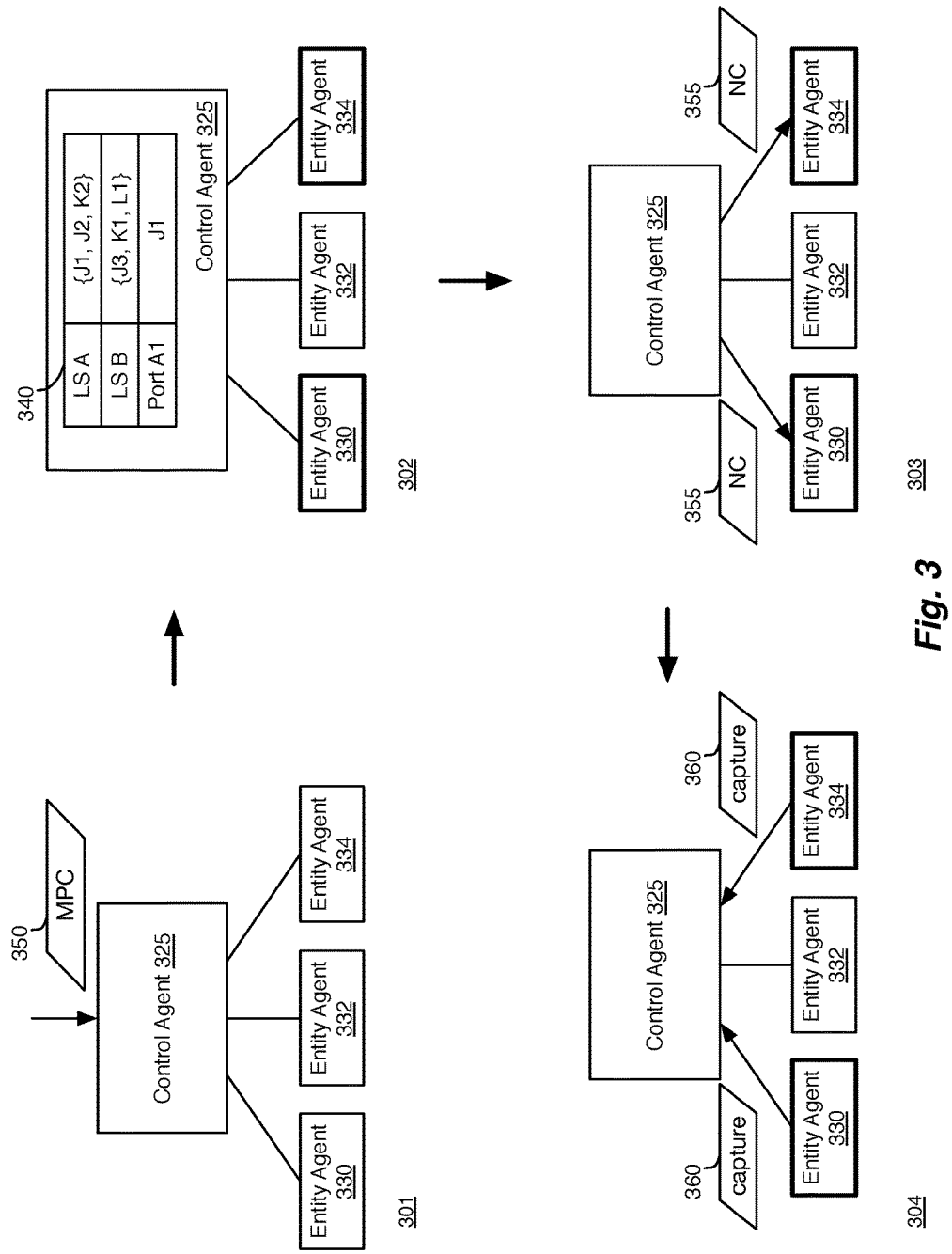
FIG. 3 illustrates an example of a control agent that manages a multi-point packet capture.

FIG. 3 illustrates an example of a control agent that manages a multi-point packet capture in four stages 301-304. The first stage 301 shows a control agent 325 that is connected to entity agents 330-334. As described above, the entity agents 330-334 may be located at various points (e.g., layers of the network stack, ports of a physical/logical forwarding element, etc.) in the network system.

The first stage 301 shows that control agent 325 receives a multi-point configuration (MPC) 350. In some embodiments, the MPC is received from an administrator of the network to configure a multi-point capture. In some embodiments, the multi-point configuration 350 is automatically generated at the master node. The master node of some embodiments monitors the network system for various events (e.g., event logs, flagged events in other multi-point analyses, failed nodes, dropped packets, etc.). The master node of some such embodiments automatically generates multi-point configuration 350 to get more detailed information for the events (e.g., specific ports at which packets are dropped, portions of a network path where packets are being corrupted, etc.).

Figure 4:
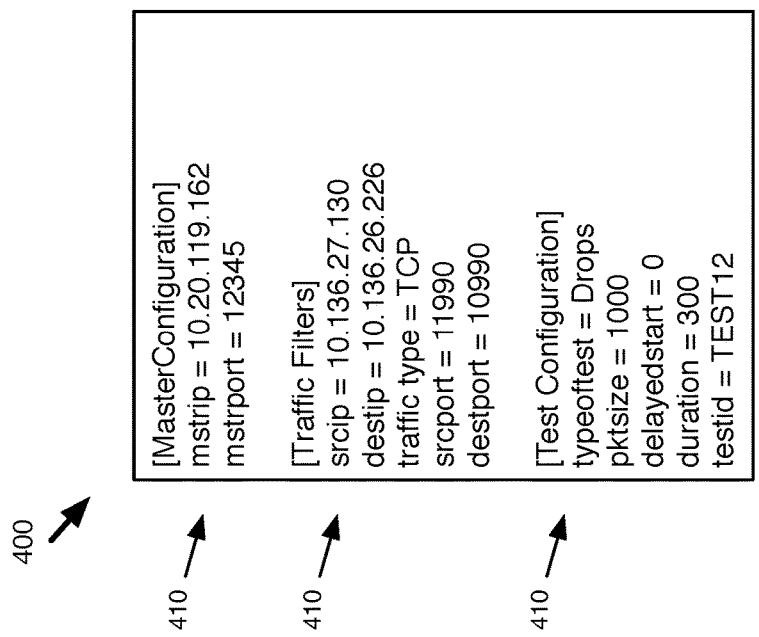
FIG. 4 illustrates an example of a configuration for a multi-point packet capture.

The MPC 350 of some embodiments includes various configuration information for configuring the multi-point capture, including session length, test type, node IDs, etc. FIG. 4 illustrates an example of a configuration for configuring a multi-point packet capture. In some embodiments, the configuration 400 is a multi-point configuration that is used by a central node (e.g., the control agent) to configure several nodes to perform a capture. In some embodiments, a similar configuration (or a customized version of the configuration 400) is sent to each node to configure the node according to the multi-point configuration.

Configuration 400 shows master configuration information 410, traffic filters 420, and test configuration data 430. The master configuration information 410 includes a master IP and a master port.

The traffic filters 420 provide different criteria for traffic that is relevant to a particular capture. In this example, the traffic filters restrict the source, destination, and traffic type of the data, but the traffic filters of different embodiments can include more or fewer filters. The various packet filters allow the packets captured at each node to be filtered prior to being sent to the control agent. By configuring the entity agents to filter the packets at each node, only packets that are relevant to a particular analysis or test are collected. This provides greater flexibility in the captures that can be performed. The filtering of the packets reduces strain in the network by lowering the memory requirements at each node and the amount of traffic generated to communicate between the entity agents and the control agent, as fewer packets are captured, stored, and transmitted through the network.

The test configuration data 430 indicates a type for the test, a packet size, a staggered start time, a duration for the test session (or session length), and a test identifier. The test type of some embodiments is used to identify a type for each test. The test type of some embodiments is used by the control agent to further configure the multi-packet capture. The packet size of some embodiments indicates a snapshot, or a portion (e.g., header values, a number of bits, etc.), of each packet to be captured. This allows for reduced processing and storage requirements by the entity agents and reduces the amount of data that needs to be sent between the various nodes and the control agent 325. The staggered start time of some embodiments is customized for each node in order to synchronize the packet captures performed at the various nodes of a multi-point capture. The staggered start times are described in further detail below.

In some embodiments, the control agent performs multiple multi-point captures at a time. For example, the control agent of some embodiments performs the multiple multi-point captures for different sets of nodes in the network. In other embodiments, the control agent performs multiple multi-point captures for the logical networks of different tenants in a datacenter. The test identifier of the test configuration data 430 allows the control agent (or the analysis engine) to identify and segregate the packet captures (or groups) for each test performed in the network.

In some embodiments, the test configuration data 430 specifies certain elements, while other elements are determined by the control agent based on the test configuration data 430. For example, in some embodiments, the duration of a test session, the filters to be applied to the captures, and/or the nodes at which to perform the captures can be determined from other elements (e.g., the test type, source/destination addresses, etc.) specified in the test configuration data.

In some embodiments, the snapshot (i.e., packet size or the portion of each packet to be captured) is determined based on the type of test being performed. For example, for a test of the performance of a tunneling protocol between nodes of the network, it is not necessary to maintain the payload of each packet, as it should not change and is not relevant to the particular test.

Referring back to FIG. 3, the second stage 302 shows that control agent 325 has a mapping 340 for a logical forwarding element that is implemented on physical forwarding elements. The configuration 340 shows mapping 340 for the LFE 225 and the corresponding physical managed forwarding elements MFE J and K as described above with reference to FIG. 2. The mapping 340 shows that the ports that make up LFE A correspond to ports J1 and J2 of MFE J and port K2 of MFE K. The ports of LFE B correspond to port J3 of MFE J and port K1 of MFE K. The mapping 340 also shows that individual logical ports (i.e., port A1 of LFE A) are mapped to their corresponding physical ports (i.e., J1).

The second stage 302 also shows that control agent 325 has identified (shown with bold lines) entity agents 330 and 334 as points (or nodes) for the multi-point capture. The control agent 325 of some embodiments identifies the entity agents for the multi-point capture based on the configuration (e.g., a test type, source/destination addresses, etc.) of the capture.

In some embodiments, the nodes are identified based on the multi-point configuration and a network topology that defines the arrangement of nodes in the network. The network topology of some embodiments includes all of the nodes in the network that the control agent is able to manage and configure for the multi-point capture. For example, in some embodiments, the control agent 325 of some embodiments uses a network topology to identify all nodes between source and destination nodes.

In this example, the configuration describes nodes based on a logically defined network. The control agent 325 of some embodiments identifies nodes of the physical network that correspond to the logical nodes. In this example, the network topology 340 defines a mapping of elements of the logical network 205 to elements in the physical network 210 of FIG. 2 to identify entity agents in the physical network at nodes relevant to the multi-point capture.

In the third stage 303, control agent 325 configures the identified entity agents 330 and 334 by sending node configurations 355 to the identified entity agents 330 and 334. In some embodiments, the control agent 325 configures the entity agents by deploying configuration scripts to be executed at the entity agents or by directly accessing the entity agents (e.g., through an API, etc.).

The node configurations 355 of some embodiments are similar to the multi-point configuration 350 received from the user, as described above with reference to FIG. 4. In some embodiments, the configurations 355 are customized (e.g., with a staggered start time, different packet filters, a batch session length, etc.) for each node.

The fourth stage 304 shows that entity agents 330 and 334 send captured packet data 360 back to control agent 325. The control agent 325 of some embodiments receives the captured packet data 360 in a series of batches. The control agent 325 of such embodiments compiles the batches from each entity agent to form packet groups for the packets captured at each entity agent.

Figure 5:
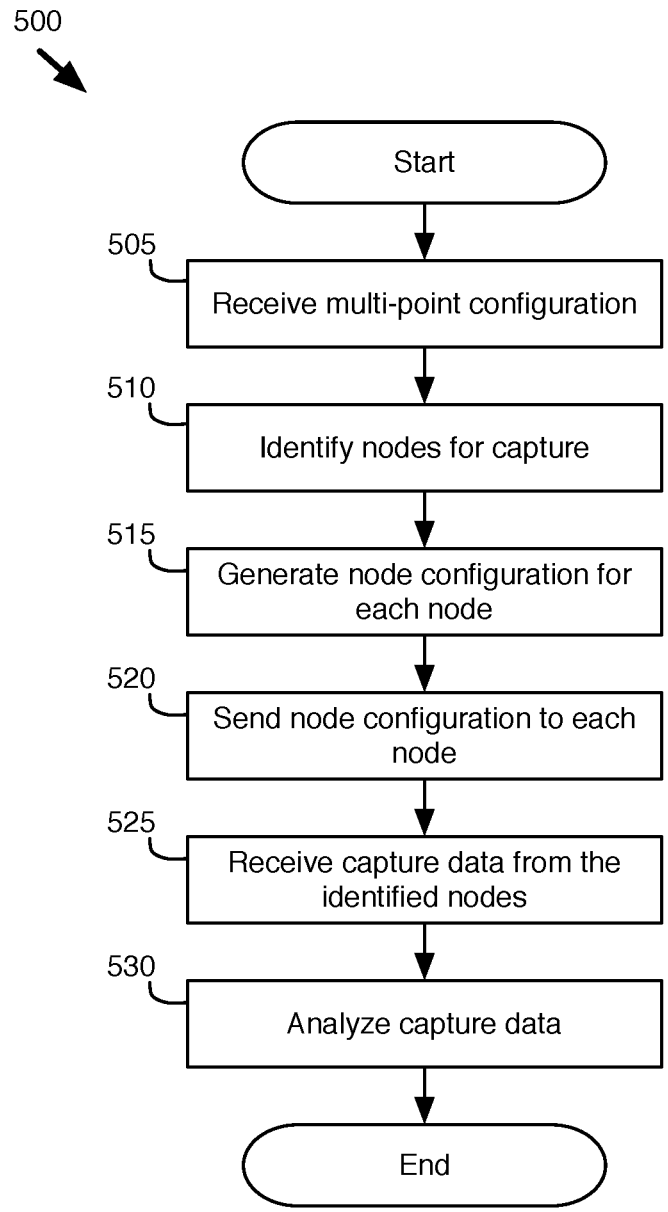
FIG. 5 conceptually illustrates a process for a control agent to perform a multi-point packet capture.

FIG. 5 conceptually illustrates a process for a control agent to perform a multi-point packet capture. The process 500 begins by receiving (at 505) a multi-point configuration for a multi-point packet capture. The process 500 then identifies (at 510) nodes for the capture and generates (at 515) a node configuration for each node. In some embodiments, the process 500 generates the capture configuration for a particular node by customizing the multi-point configuration to be specific to the particular node based on various properties (e.g., memory requirements, logical-physical network mappings, packet round-trip times, etc.) of the particular node.

In some embodiments, the process 500 generates (at 515) the customized configuration by calculating a staggered start time for each node. The staggered start times of some embodiments indicate an offset of the particular node from a particular time (e.g., a time at the master node) that would allow each of the nodes to begin a capture at a same time. The different start times of the different nodes may arise for many reasons, e.g., when a path to a node is congested, a node is overburdened, clock skew, etc. The staggered start times calculated for each node allow the capture process to be further optimized, as nodes can fine tune the start times for their captures and avoid unnecessarily capturing packets that are not relevant to a particular capture. The synchronized capture is crucial for observing the same traffic at every node, as it flows through the network.

The process 500 of some embodiments calculates the staggered start times for each node as a function of a time skew calculated for each node and a round-trip time for communications with the node. The calculation of the time skew is described in further detail below with reference to FIG. 7.

In some embodiments, the process 500 generates (at 515) the customized configuration by designating a batch session length for each node. For diagnosing some network issues which take longer to manifest, the packet captures need to be performed over a longer period of time. This can cause memory depletion issues and also packet capture files to overrun, if the session duration is too long. When the session duration is above a certain threshold, the nodes will send the packet traces to the control agent (at the master node) in batches at regular intervals.

In some embodiments, the batch session length is a configurable property which defines the length of a packet capture to be performed at each node before it the captured batch is sent to the control agent. In other embodiments, the duration of a batch session is determined based on memory availability at each node. For example, in some embodiments, each node sends a batch of packet captures when the available memory at the node reaches a particular threshold level.

Once the customized configuration has been generated (at 515) for each node, the process 500 sends (at 520) the generated node configuration to each identified node and receives (at 525) capture data from the identified nodes. Finally, the process 500 analyzes (at 530) the capture data received from the nodes in the network system. The analysis of the capture data is described in further detail below in Section III.

Figure 6:
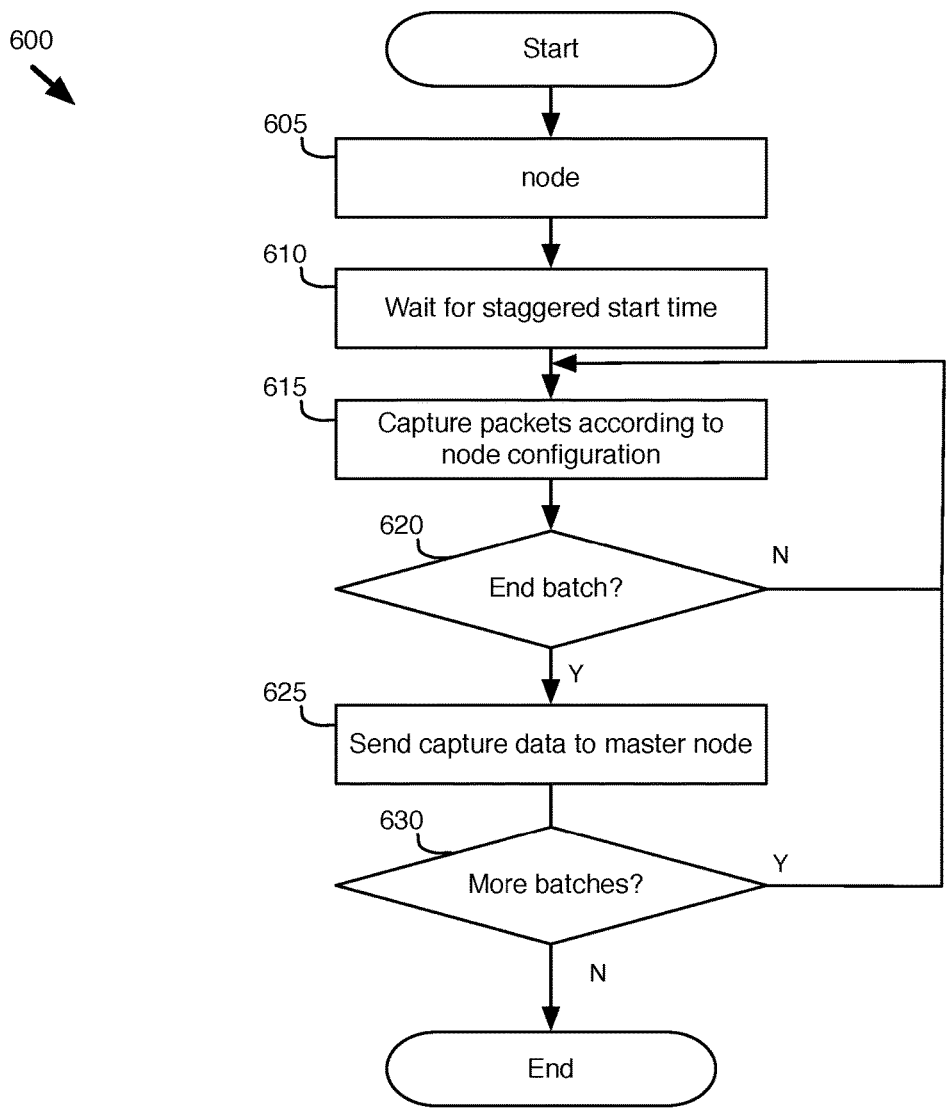
FIG. 6 conceptually illustrates a process for an entity agent to perform a packet capture.

FIG. 6 conceptually illustrates a process for an entity agent to perform a packet capture. The process 600 of some embodiments is performed by the entity agents operating at the various points in the network system. The process 600 begins by receiving (at 605) a node configuration. In some embodiments, the node configuration is received from a control agent operating on a master node, as described above with reference to FIG. 1.

The process 600 then waits (at 610) for a staggered start time. In some embodiments, the staggered start time is provided in the node configuration from the control agent. The staggered start time allows the different nodes to begin their captures at a same (or similar) time, or with specific offsets to optimize the capture of the packets at the different nodes of the network system.

After waiting for the staggered start time, the process 600 captures (at 615) packets according to the received node configuration. The received node configuration of some embodiments defines filters and capture parameters to limit the packets that are captured at each node. For example, in some embodiments, process 600 only captures traffic for a particular logical forwarding element, a particular source/destination address, a particular type of traffic, etc.

The process 600 then determines (at 620) whether to end a batch. In some embodiments, the process 600 determines to end a batch when a current capture batch duration is greater than a threshold duration. In some embodiments, the threshold duration is received as a part of the node configuration. In other embodiments, each node receives the session length (i.e., the length of the entire capture session) and determines whether to break the session into smaller batches. In some embodiments, a node determines to break a session into smaller batches based on memory constraints. In some embodiments, rather than a period of time, the process 600 determines (at 620) whether to end a current capture batch based on available memory (e.g., when the available memory reaches a particular level).

When process 600 determines (at 620) not to end a batch, the process 600 returns to step 615 to capture additional packets for the batch. When process 600 determines (at 620) to end a batch, the process 600 sends (at 625) the capture data to the master node. Process 600 then determines (at 630) whether there are any more batches (i.e., whether the session is complete). If the session is not complete, the process 600 returns to step 615 and begins capturing more packets for the next batch. Otherwise, the process 600 ends. Once the nodes have performed the captures, the nodes send the packet captures back to the control agent of the master node.

As described above, in order to synchronize the performance of packet captures, some embodiments calculate a staggered start time based on a time skew for the different nodes. The time skew indicates the difference in the clocks of each node with reference to the control agent. The time skew of some embodiments is calculated based on a set of time requests and round-trip time for packets traveling to each node. The round-trip times indicate the amount of time required to exchange messages with a particular node. Especially in the case of logical networks implemented on distributed physical network elements in different geographic areas, the round-trip time to the various nodes may be significant.

Figure 7:
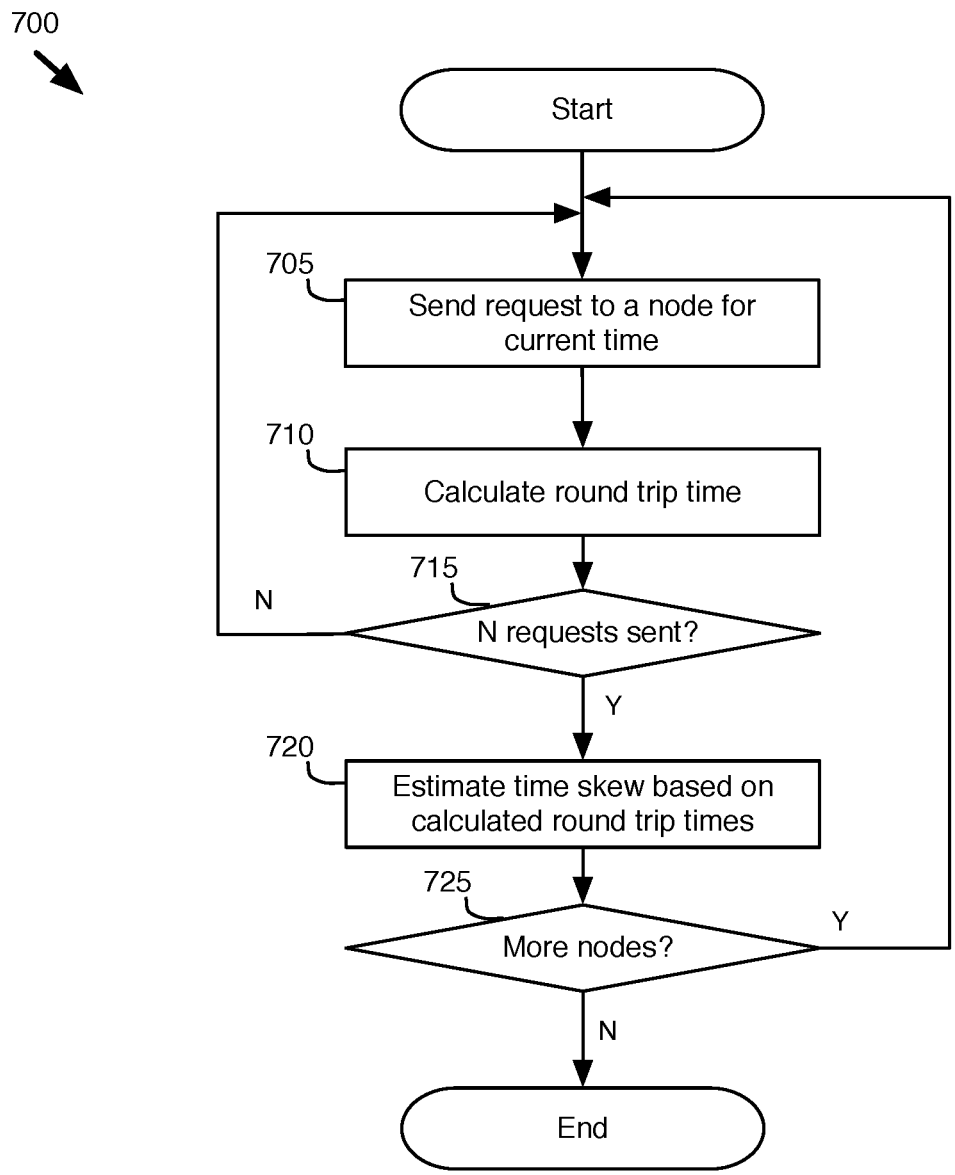
FIG. 7 conceptually illustrates a process for calculating time skew for nodes in the network.

FIG. 7 conceptually illustrates a process for calculating time skew for nodes in the network. Process 700 sends (at 705) a request to a node for a current time at the device. Process 700 calculates (at 710) a round trip time for the request. Process 700 then determines (at 715) whether a particular number (N) of requests have been sent (and whether N round trip times have been calculated). When the N requests have not been sent, the process 700 returns to step 705 and sends another request.

When the N requests have been sent, process 700 estimates (at 720) a time skew for the node based on the requested node times and the calculated round trip times. In some embodiments, the time skew is calculated based on a statistical analysis of the several packets exchanged with the particular node. For example, the clock at a particular node may be offset from a clock at the central node by 4 seconds. This can be determined by comparing the clock times received from the particular node with the clock time at the central node, and adjusting for the amount of time required for the messages to be exchanged with the particular node. In some embodiments, this process is performed several times and an average is taken to estimate the time skew.

The process 700 then determines (at 725) whether there are more nodes for which a time skew needs to be calculated. When there are more nodes, the process 700 returns to step 705 and sends requests to the next node. When there are no more nodes, the process 700 ends.

III. Multi-Point Packet Capture Analysis and Display

Figure 8:
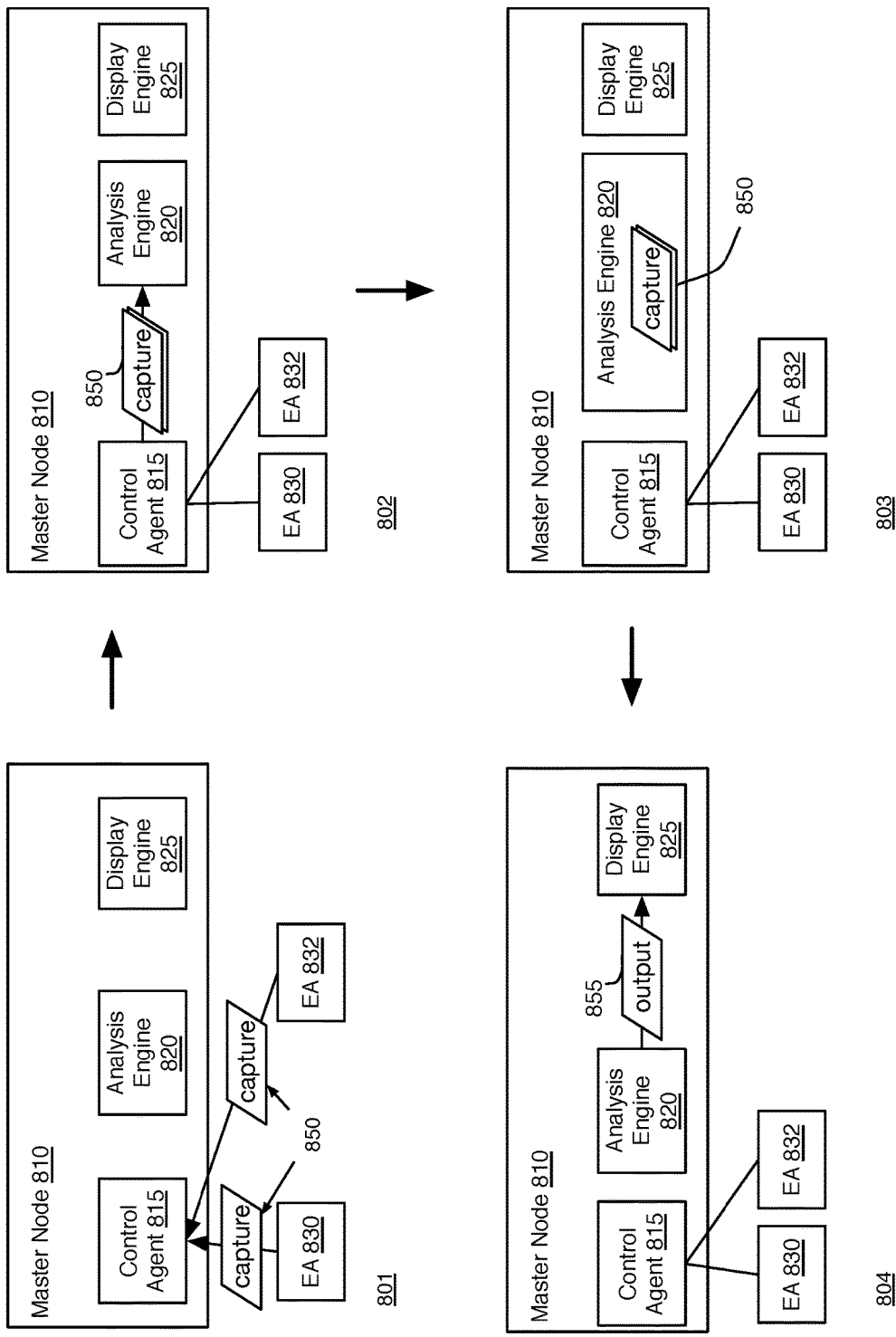
FIG. 8 illustrates an example of analyzing and displaying results from a multi-point packet capture.

In some embodiments, once the control agent has received the individual captures of the multi-point captures from the various nodes, the master node analyzes the captures and displays the results of the analysis. FIG. 8 illustrates an example of analyzing and displaying results from a multi-point packet capture in four stages 801-804. The example of this figure shows a master node 810 that communicates with entity agents 830 and 832. The master node 810 has a control agent 815, analysis engine 820, and a display engine 825, like the example of FIG. 1. In some embodiments, the analysis engine 820 is a standalone component that analyzes offline multi-point packet groups captured at various nodes in a network to flag any issues and provide relevant visualizations.

In the first stage 801, the entity agents 830 and 832 send capture data 850 to the control agent 815 of the master node 810. The second stage 802 shows that the control agent 815 receives and compiles the capture data 850 and sends it to the analysis engine 820. In some embodiments, the control agent 815 waits until it receives all of the capture data from all of the nodes identified for the multi-point capture before sending it on to the analysis engine 820.

The third stage 803 shows that analysis engine 820 then processes the multi-point capture data to analyze the multiple packet groups to flag potential issues and/or to allow a user to trace packets through the various packet groups. In some embodiments, the analysis engine 820 builds a picture of how the traffic-flow patterns change as the packets pass through various nodes. The analysis engine 820 of some embodiments evaluates the different captures to determine latencies and delays between the different nodes.

In order to perform an analysis across the collected packet groups, each packet needs to be followed through the different packet groups, as it traverses through the network. In order to identify packets in the different packet groups, the analysis engine 820 of some embodiments generates a unique identifier for each packet within each packet group based on immutable values (e.g., header and payload values that do not change) of the packet. With a unique identifier for each packet, the analysis engine 820 is able to check for the presence of the packet in each available capture to see whether or not it reaches a certain node.

In some embodiments, packets are modified (e.g., fragmented, encapsulated, etc.) as they traverse the network. Such modifications can make it difficult to identify the path of the packet through captures at the various nodes. Some embodiments perform a multi-pass analysis of the multi-point packet captures to identify packets and their corresponding packets in the different packet captures. The correlation of packets in the different captures of some embodiments is performed with a multi-pass analysis, described below with reference to FIGS. 9-12.

The analysis engine 820 of some embodiments identifies a particular packet (or a set of packets) as they travel through the network system. In some embodiments, analysis engine 820 identifies the particular packet (or a corresponding set of packets) in each of the different packet groups. The analysis engine 820 of some embodiments compares the packets of the correlated multi-point packet groups to flag issues such as corruption in the packets, latency between different nodes, and the location of dropped packets.

In the fourth stage 804, the analysis engine 820 sends the analyzed output data 855 to the display engine 825 to be displayed for the user. Analysis engine 820 of some embodiments identifies a particular set of packets (and corresponding sets of packets) and display engine 825 then displays the captures from the different nodes, identifying (e.g., highlighting, showing in a different color, etc.) the particular packet as it travels through the different nodes.

In different embodiments, the movement of a packet through the nodes is displayed in different ways (e.g., visual animations, tabular reporting, etc.) to visualize the life of a packet. This can be instrumental in analyzing traffic flows in a data center, which is key to troubleshooting and monitoring the network traffic. In some embodiments, the capture data is re-analyzed and re-displayed based on user input. For example, in some embodiments, different packets of the capture data are highlighted in the displayed analyses based on user selection of different packets in a GUI.

In some embodiments, in order to analyze and display data for a multi-point packet capture, a multi-pass correlation of the packet groups is necessary to identify packets and their corresponding packets in the different packet groups. FIGS. 9-12 provide examples of different identifiers that are generated through a multi-pass correlation process. The identifiers of some embodiments are generated based on immutable values (e.g., packet headers and/or payload values, etc.) of each packet that uniquely distinguish each packet from other packets at each capture point.

Figure 9:
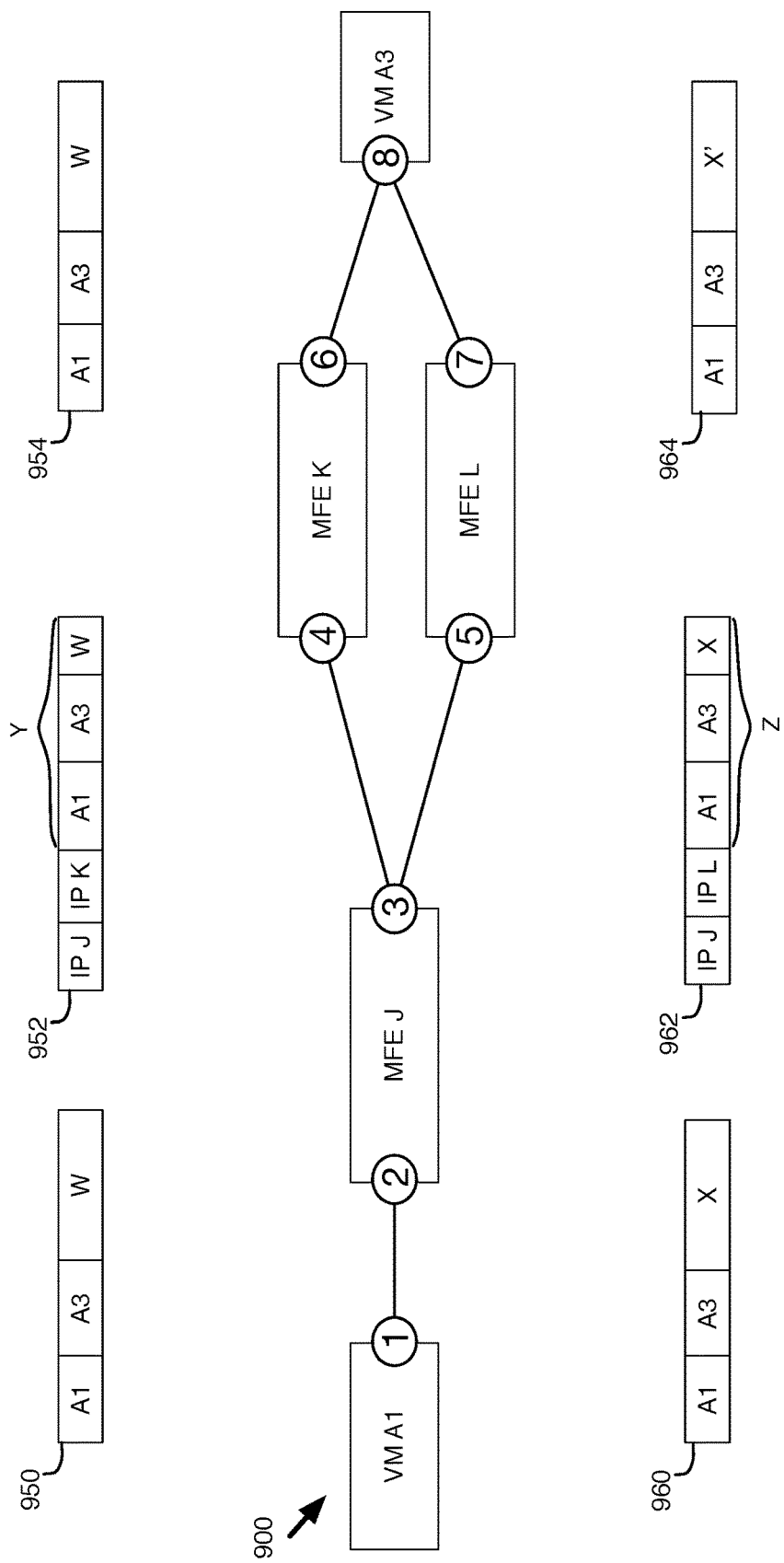
FIG. 9 illustrates an example of a network system in which packets are captured at various nodes.

FIG. 9 illustrates an example of a network system in which packets are captured at various nodes. This figure shows an example of two packets 950 and 960 that are sent through a network 900. Network 900 includes VMs A1 and A3, which communicate through MFEs J, K, and L. Each element of the network 900 shows a node (indicated by an encircled number) at which packets are captured.

The packets 950 and 960 are encapsulated (and tunneled) through the network 900. The encapsulated packets 952 and 962 are sent between MFE J and MFEs K and L, where they are decapsulated. The decapsulated packets 954 and 964 are sent to the destination VM A3.

Figure 10A:
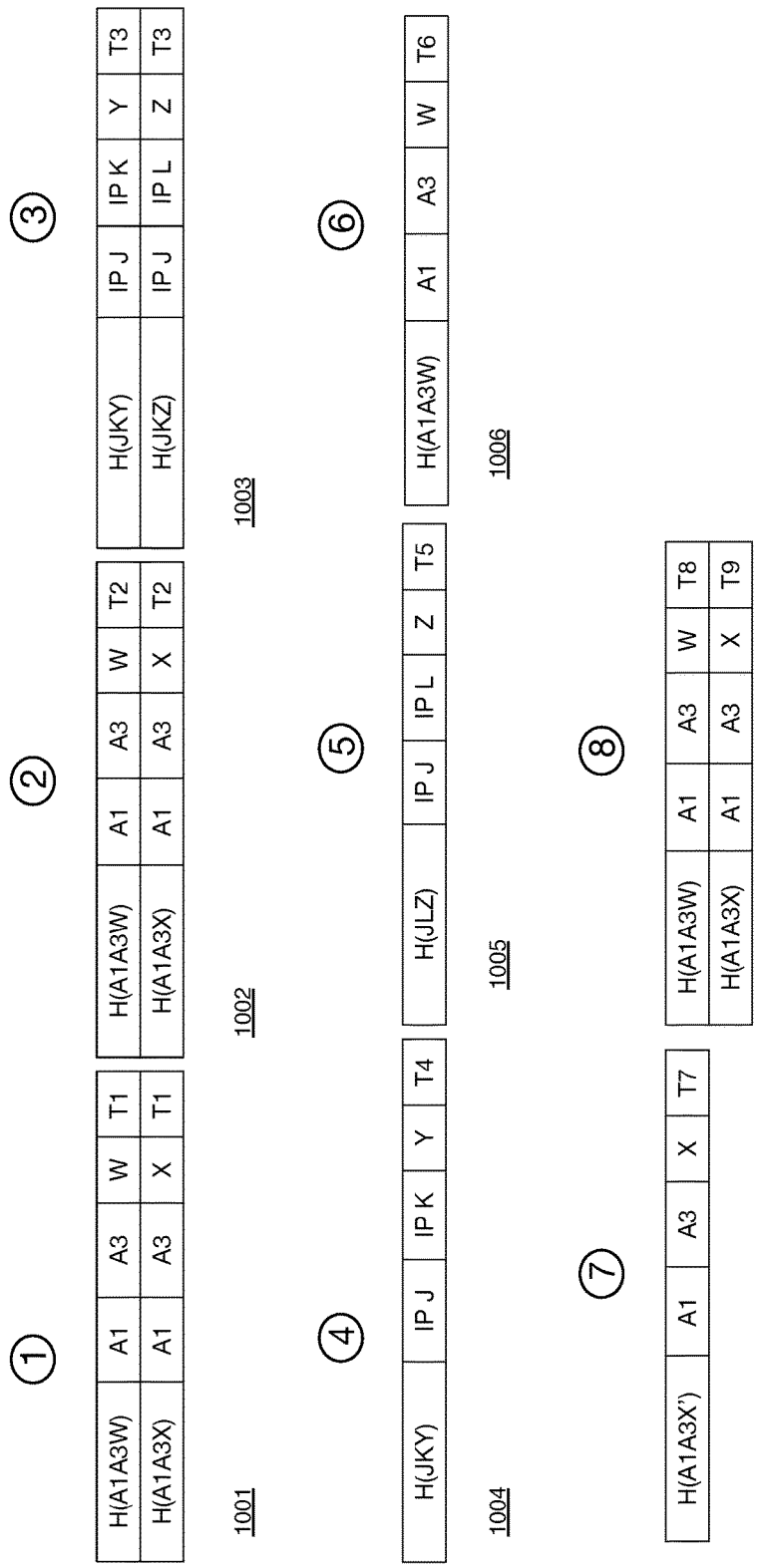

The example of this figure is described with reference to FIGS. 10A-B. FIGS. 10A-B illustrate an example of packet groups captured at various points of the network system 900 of FIG. 9. The packet groups of some embodiments are gathered by a control engine and analyzed by an analysis engine, as described above. In this example, the analysis engine has also generated a first set of identifiers for each packet. The identifier is computed to produce a unique value (e.g., a hash) based on portions (e.g., header, payload, etc.) of the packet that uniquely identify the packet as it traverses the network.

The first packet group 1001 shows the packets 950 and 960 as they exit VM A1 through node 1. The second packet group 1002 shows the same packets with the same identifiers as they enter MFE J through node 2. In the second packet group 1002, the packets are captured at a different time T2.

The third packet group 1003 shows that the packets 950 and 960 have been encapsulated (or tunneled) at MFE J, shown as encapsulated packets 952 and 962. Packet 952 now has header values with IP J and IP K, and the payload Y. IP J and IP K are addresses (e.g., media access control (MAC) addresses) that are used for sending the packet from MFE J to MFE K. The payload Y represents the original packet with headers A1 and A3 and the payload W. Similarly, packet 960 now has header values with IP J and IP L (for MFEs J and L), and the payload Z. The payload Z represents the original packet with headers A1 and A3 and the payload X.

The analysis engine of some embodiments uses the generated identifiers (e.g., hash values) of the packets in the different packet groups to flag issues in the network. For example, the identifier for the packet 950 (i.e., H(A1A3C)) is found in packet group 1202, but not in packet group 1203, even though it is expected to pass through node 3. The analysis engine of some embodiments flags the packet as missing because it is not found in a packet group along the expected path. In this example, the packet does pass through node 3, but because it is encapsulated, it is not properly identified as being the same packet.

When a packet is corrupted, it will appear to be a new packet with no corresponding packet in the previous packet captures. For example, the identifier for packet 954 (i.e., H(A1A3W)) is found in the sixth packet group 906, but it is not found in a previous packet group 1004 along the path of the packet. In some embodiments, when a "new" packet is identified along the path of a packet, but it is not captured in a previous packet group, the packet is flagged as being corrupted. In this example, the "new" packet is simply the decapsulated packet, but as the identifiers do not match it is not identified as being the same packet.

In addition to identifying new and missing packets, the analysis engine of some embodiments compares the capture times (e.g., times T1-T11) for the different packets to determine whether there is latency between any of the nodes. However, in some cases, the clocks at the different nodes will be skewed or offset from each other. The analysis engine of some such embodiments calculates (or uses a previously calculated) a time skew for normalizing the analysis of the packets in the different captures, as described above with reference to FIG. 7. The analysis engine uses the calculated time skew to modify timestamps for the packets captured at the different nodes and uses the modified timestamps to calculate the latency for packets traveling between the nodes.

In some embodiments, the packets 950 and 960 are sent along different paths through the network for various reasons. For example, the packets 950 and 960 may be sent along different paths for load balancing, or because one of the packets is a special type of traffic that needs to be handled by a particular device (e.g., a firewall, etc.). The fourth packet group 1004 and the fifth packet group 1005 are captured at nodes on different MFEs K and L.

The sixth and seventh packet groups 1006-1007 show that the packets 954 and 964 have been decapsulated. Packets 954 and 964 match the original packets 950 and 960 respectively. Finally, the eighth packet group 1008 shows that packet 950 and packet 960 have been received at VM A3 at times T8 and T9 respectively.

As the identifiers (i.e., H(JKY) and H(JLZ)) for packets 952 and 962 at nodes 3-5 are based on encapsulating headers of the packets, they do not correspond to the identifiers (i.e., H(A1A3W) and H(A1A3X)) original packets 950 and 960.

An analysis based on these identifiers would suggest that the packets have been dropped or corrupted.

In some embodiments, the analysis engine performs a multi-pass correlation to identify corresponding packets in the different packet groups. The multi-pass correlation of some embodiments generates one or more sets of identifiers for the packets within each packet group. In this example, the second pass generates identifiers based on a different portion of the packet (inner packets). FIG. 10B shows a second set of packet groups 1011-1018 after a second pass. The first, second, sixth, seventh, and eight packet groups are unchanged from the first pass. As the packets 950 and 960 are unencapsulated in these packet groups, there are no inner header values from which to generate a second identifier. In packet groups 1013-1015, with encapsulated packets (identified as H(JKY) and H(JLZ)), the second pass identifies new identifiers H(A1A3W) and H(A1A3X) for the encapsulated packets 952 and 962 based on the inner packet headers. The second pass identifiers now correspond to the first pass identifiers for the decapsulated packets 950 and 960. Using the first and second pass identifiers, the packets 950 and 960 can be traced through all of the packet captures 1011-1018.

Figure 11:
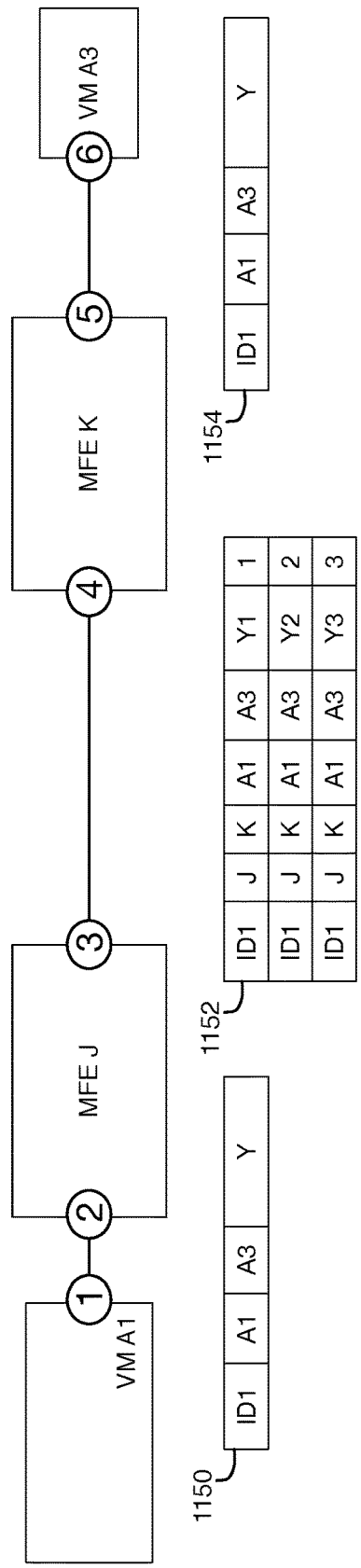
FIG. 11 illustrates an example a network system with packets to be analyzed for fragmentation at various points of a network system.
Figure 12:
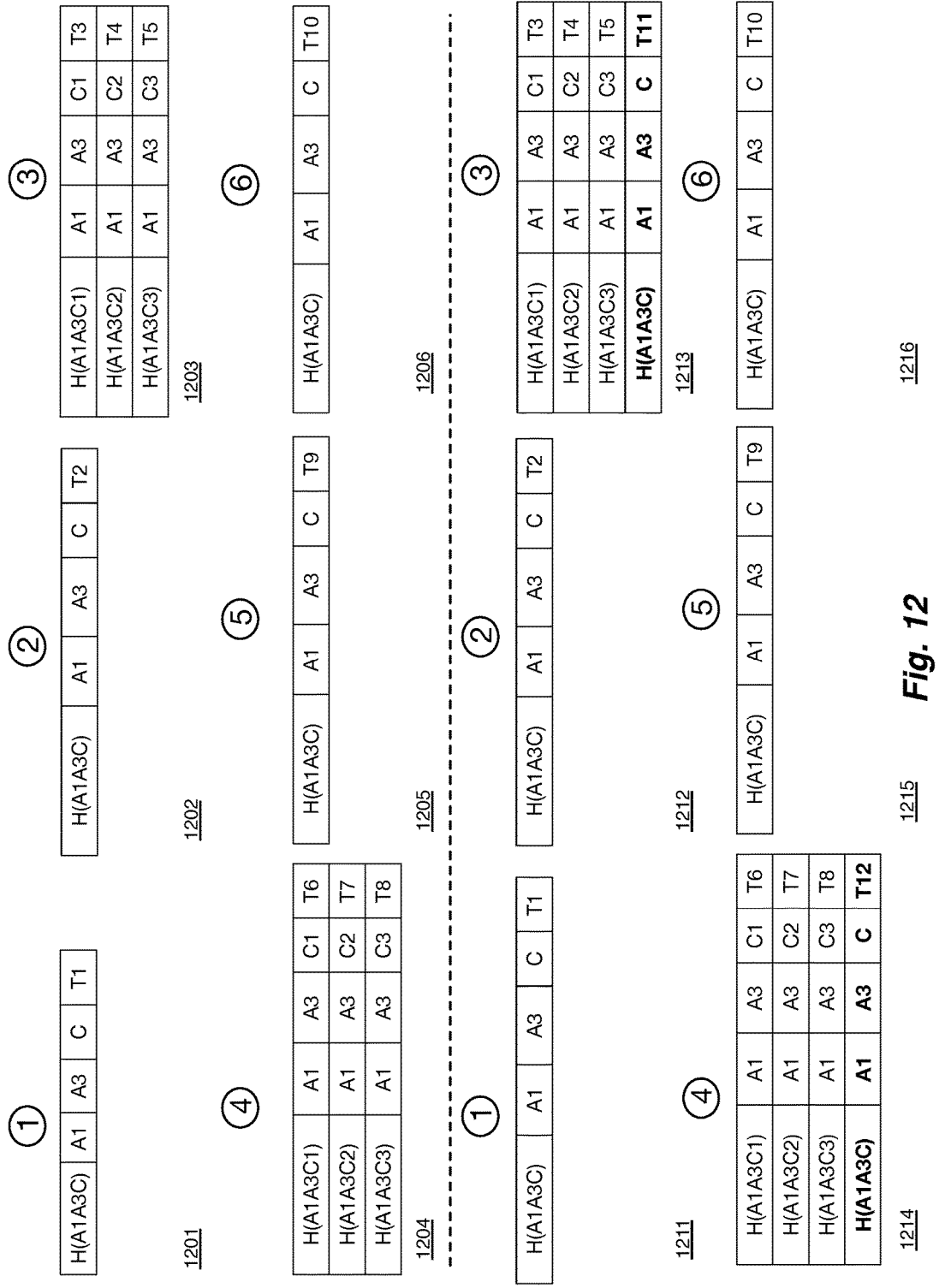
FIG. 12 illustrates an example of packet captures from the various points of the network system of FIG. 11.

In some embodiments, the multi-pass correlation operation generates a second set of identifiers based on reassembled fragments for packets passing through the network. FIG. 11 illustrates an example a network system with packets that are fragmented (or segmented) at various points in a network system. Fragmentation and segmentation occur when a packet is divided into multiple parts. Fragmentation occurs at Layer 3 (IP) and segmentation occurs at Layer 4 (TCP). Fragmentation occurs when packets that are larger than the Maximum Transmission Unit (MTU) of an interface are sent out this interface. Segmentation takes place when an application sends data which is broken into what "best-sized" chunks. The fragments (or segments) can be reassembled based on an identifier used for each of the fragments of the original packet. The example of this figure is described with reference to FIG. 12. FIG. 12 illustrates an example of packet captures from the various points of the network system of FIG. 11.

The first pass packet groups 1201-1208 shows the packet 1150 as it passes through the various nodes (indicated as encircled numbers) of the system 1100. The first and second packet groups 1201-1202 show that packet leaves node 1 of VM A1 at time T1 and enters node 2 at MFE J at time T2.

The third and fourth packet groups 1203-1204 show that the packet 1150 has been fragmented into three packet fragments 1152. The packet fragments 1152 divide the packet 1150 with payload Y into separate portions with payloads Y1-Y3. The packet fragments 1152 include a counter that can be used to reassemble the fragments back into the original packet 1150.

The fifth and sixth packet groups 1205-1206 show that the MFE K reassembles the packet fragments 1152 to send packet 1154 to the VM A3. Reassembled packet 1154 matches the packet 1150 sent from VM A1.

As the packet has been fragmented, the identifiers for the different packet fragments (i.e., H(A1A3C1), H(A1A3C2), and H(A1A3C3)), do not match the identifier (i.e., H(A1A3C) of the original packet 1150. When there are many packets captured at each node, it is difficult to determine which packet fragments correspond to the original packet 1150.

In some embodiments, the analysis engine generates a second set of identifiers based on reassembled packets. The second pass packet groups 1211-1216 are similar to the original packet groups 1201-1206. However, in the third and fourth packet groups 1213 and 1214 of the second pass, the analysis engine has reassembled the packet fragments and generated an identifier (i.e., H(A1A3C)) for the things.

Figure 13:
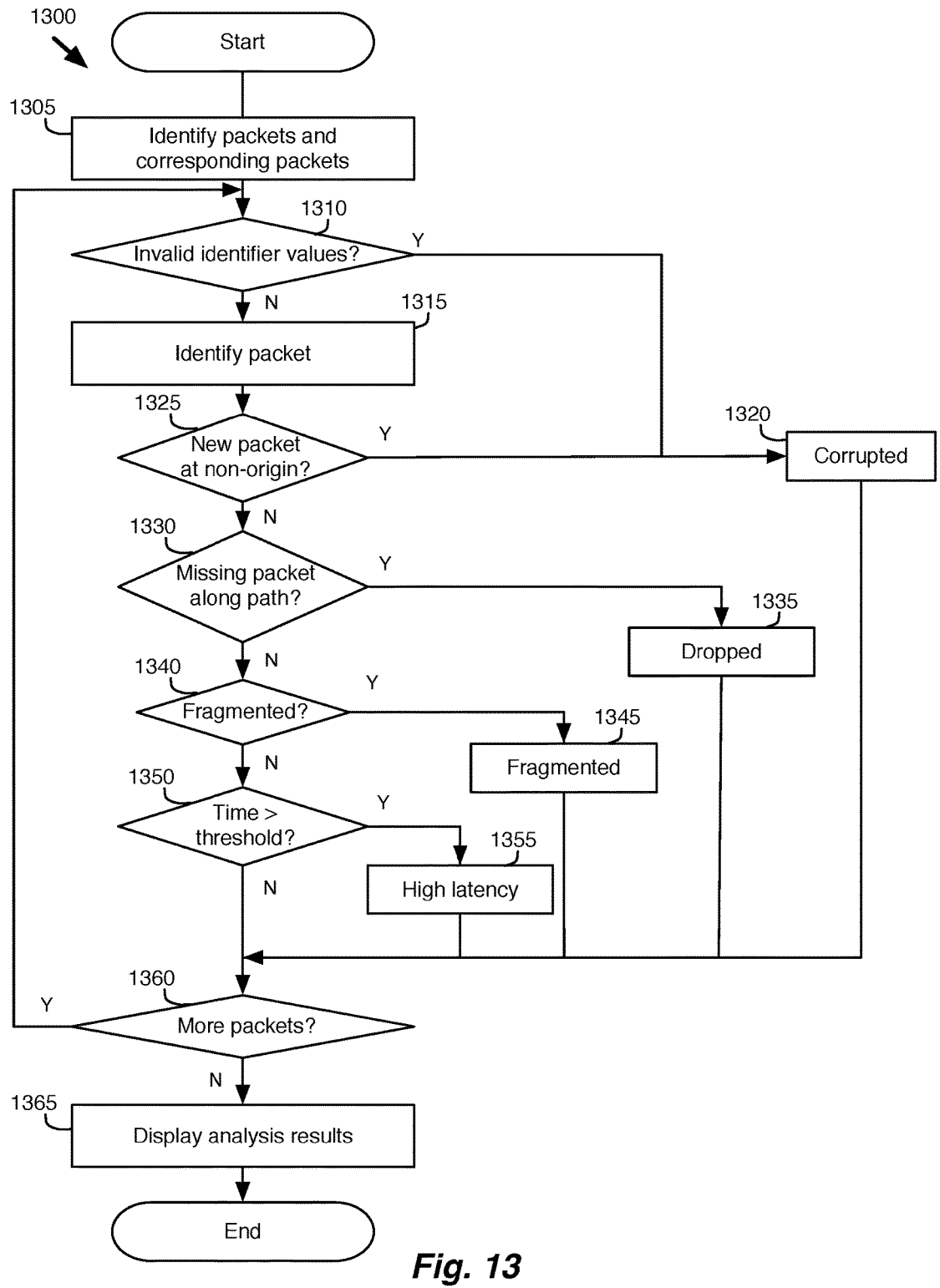
FIG. 13 conceptually illustrates a process for analyzing multiple packet capture groups.

FIG. 13 conceptually illustrates a process for analyzing multiple packet capture groups. The process 1300 of some embodiments is performed by an analysis engine based on multi-point packet captures. Process 1300 identifies (at 1305) packets and their corresponding packets in each of several packet captures. In some embodiments, the identification of the packets and their corresponding packets is performed with a multi-pass process, as described above.

Process 1300 then determines (at 1310) whether the identifier values (e.g., header values) for any of the packets in the packet groups are invalid. In some embodiments, the process 1300 verifies the validity of values in header fields of the packet based on allowed values for the different header fields according to a protocol specified for the packet. When the process 1300 determines (at 1310) that the headers are invalid, the process 1300 flags (at 1320) the packet as corrupted and continues to step 1360, described below. By initially identifying any packets with invalid header values, the process 1300 eliminates the need to evaluate packets that (due to corrupted identifier values) will not match with identifiers of any packets in the packet groups.

When the process 1300 determines (at 1310) that the headers are valid, process 1300 identifies (at 1315) a packet to be evaluated in the packet groups. The process 1300 then determines (at 1325) whether the packet is detected as a new packet at a non-origin node (i.e., has no matching packet in a previous capture). When the process 1300 determines (at 1325) that the packet is a new packet, the process 1300 flags (at 1320) the packet as corrupted and continues to step 1360, described below. When a new packet is detected, it is likely a corrupted version of an existing packet. This depends on the type of test being performed, as there may be good reason for a new packet to appear at a non-originating node.

When the process 1300 determines (at 1325) that the packet is not new at any non-origin node, the process 1300 determines (at 1330) whether the packet goes missing along an expected path for the packet (i.e., has no matching packet in a next capture). When the process 1300 determines (at 1330) that the packet goes missing, the process 1300 flags (at 1335) the packet as dropped and proceeds to step 1360.

When the process 1300 determines (at 1330) that the packet does not go missing, the process 1300 determines (at 1340) whether the packet becomes fragmented. Fragmentation (or segmentation) occurs when a packet is divided into multiple parts. When the process 1300 determines (at 1340) that the packet does become fragmented, the process 1300 flags (at 1345) the packet as fragmented and proceeds to step 1360.

When the process 1300 determines (at 1340) that the packet does not become fragmented, the process 1300 determines (at 1350) whether a time difference between capture times at consecutive nodes is greater than a threshold value (i.e., whether it takes too long for a packet to reach a node from another node). When the process 1300 determines (at 1350) that the difference in the capture times exceeds the threshold value, the process 1300 flags (at 1355) the packet as having high latency and proceeds to step 1360.

In some embodiments, determining whether there is high latency between nodes is determined based on a computed time skew for the various nodes. The process of some embodiments calculates (or uses a previously calculated) a time skew for normalizing the analysis of the packets in the different captures, as described above with reference to FIG. 7.

At 1360, the process 1300 determines whether there are any more packets to be processed. When there are more packets to process, the process 1300 returns to step 1310 and identifies another packet. Otherwise, the process 1300 displays (at 1365) the results of the analysis and the process ends.

Figure 14:
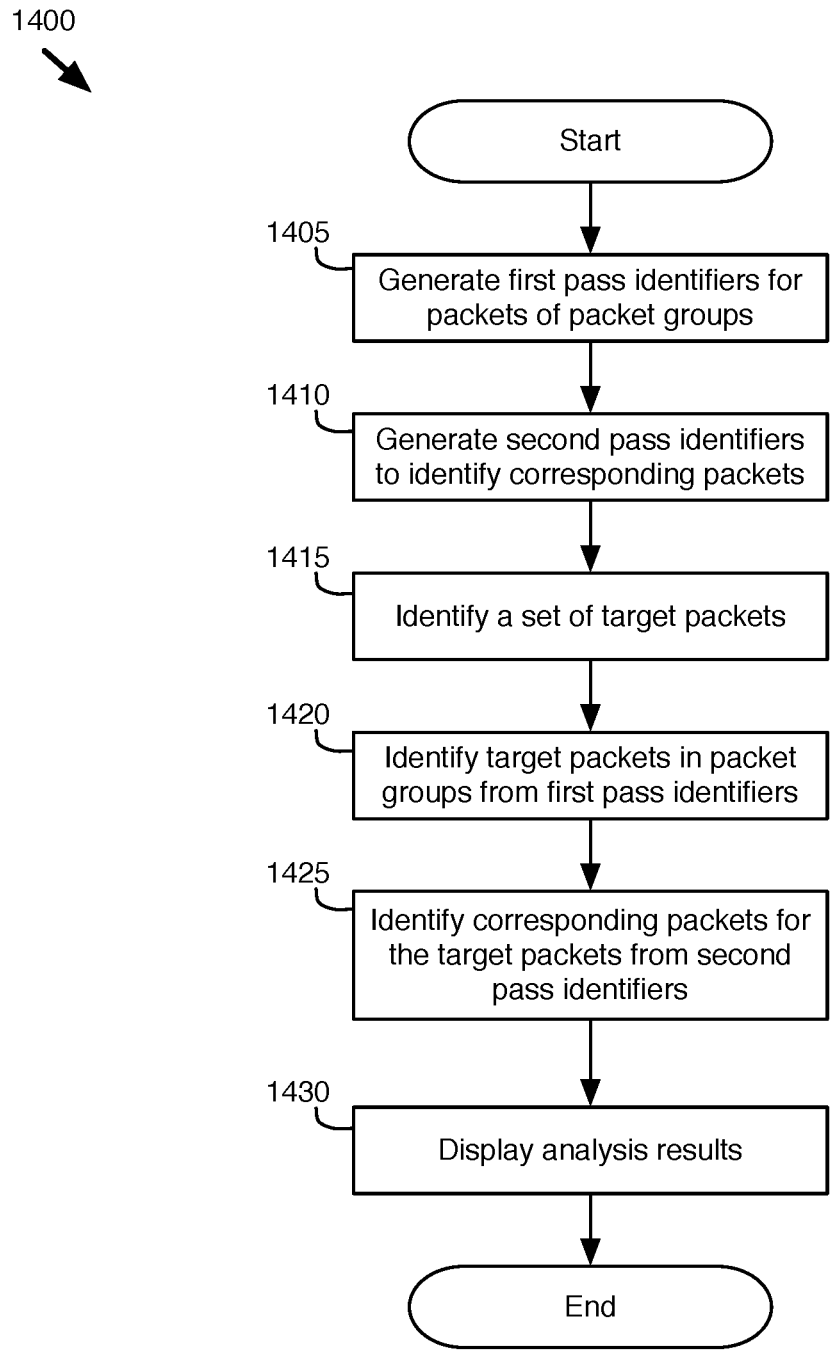
FIG. 14 conceptually illustrates a process for displaying target packets and their corresponding packets in multiple packet capture groups.

In some embodiments, the display of the analysis provides an interactive analysis, allowing a user to drill down into more detailed views of the analyzed data and providing specialized visualizations (e.g., more specific filters). FIG. 14 conceptually illustrates a process for displaying target packets and their corresponding packets in multiple packet capture groups. The process 1400 of some embodiments is performed by a packet capture analysis application with a graphical user interface (GUI).

The process 1400 generates (at 1405) first pass identifiers for packets of the packet groups. The process 1400 then generates (at 1410) second pass identifiers to identify corresponding packets in each of the packet groups.

The process 1400 then identifies (at 1415) a set of target packets. The target packets of some embodiments include a particular packet that is selected by a user viewing the GUI. In some embodiments, the target packets include packets that are identified as having issues after an analysis, such as that described above with reference to FIG. 13.

The process 1400 of some embodiments then identifies (at 1420) the target packets in each of the packet groups based on the first pass identifiers for the packets captured in the packet group. The process 1400 then identifies (at 1425) corresponding packets generated for the target packets from the second pass identifiers. In some embodiments, each packet group should have a set of packets with either a first pass identifier or a second pass identifier that matches the identifier for the target packet, unless the target packet has been dropped.

The process 1400 then displays (at 1430) the results of the analysis. In some embodiments, the process 1400 is performed continually as a user interacts with the GUI of a packet capture analysis application, identifying packets and corresponding packets in the multiple packet captures displayed in the GUI.

FIG. 15 illustrates an example of a GUI for displaying multiple packet capture groups in two stages 1501 and 1502. The first stage 1501 shows GUI 1500 that displays packets from four packet groups 1511-1514. The second packet group 1512 shows that a packet with identifier ID2 has been highlighted. In some embodiments, the highlighted packet is a packet that is identified by a multi-point capture analysis. In this example, packet ID2 is highlighted because it has been dropped, and was not captured in the third packet group 1513.

The first stage 1501 also shows that a user selects a packet with ID3 from the first packet group 1511. In the second stage 1502, in response to the selection of the packet ID3, corresponding packets have been highlighted in the other packet groups 1512-1514.

IV. Electronic System

Many of the above-described features and applications are implemented as software processes that are specified as a set of instructions recorded on a computer readable storage medium (also referred to as computer readable medium). When these instructions are executed by one or more computational or processing unit(s) (e.g., one or more processors, cores of processors, or other processing units), they cause the processing unit(s) to perform the actions indicated in the instructions. Examples of computer readable media include, but are not limited to, CD-ROMs, flash drives, random access memory (RAM) chips, hard drives, erasable programmable read-only memories (EPROMs), electrically erasable programmable read-only memories (EEPROMs), etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 16:
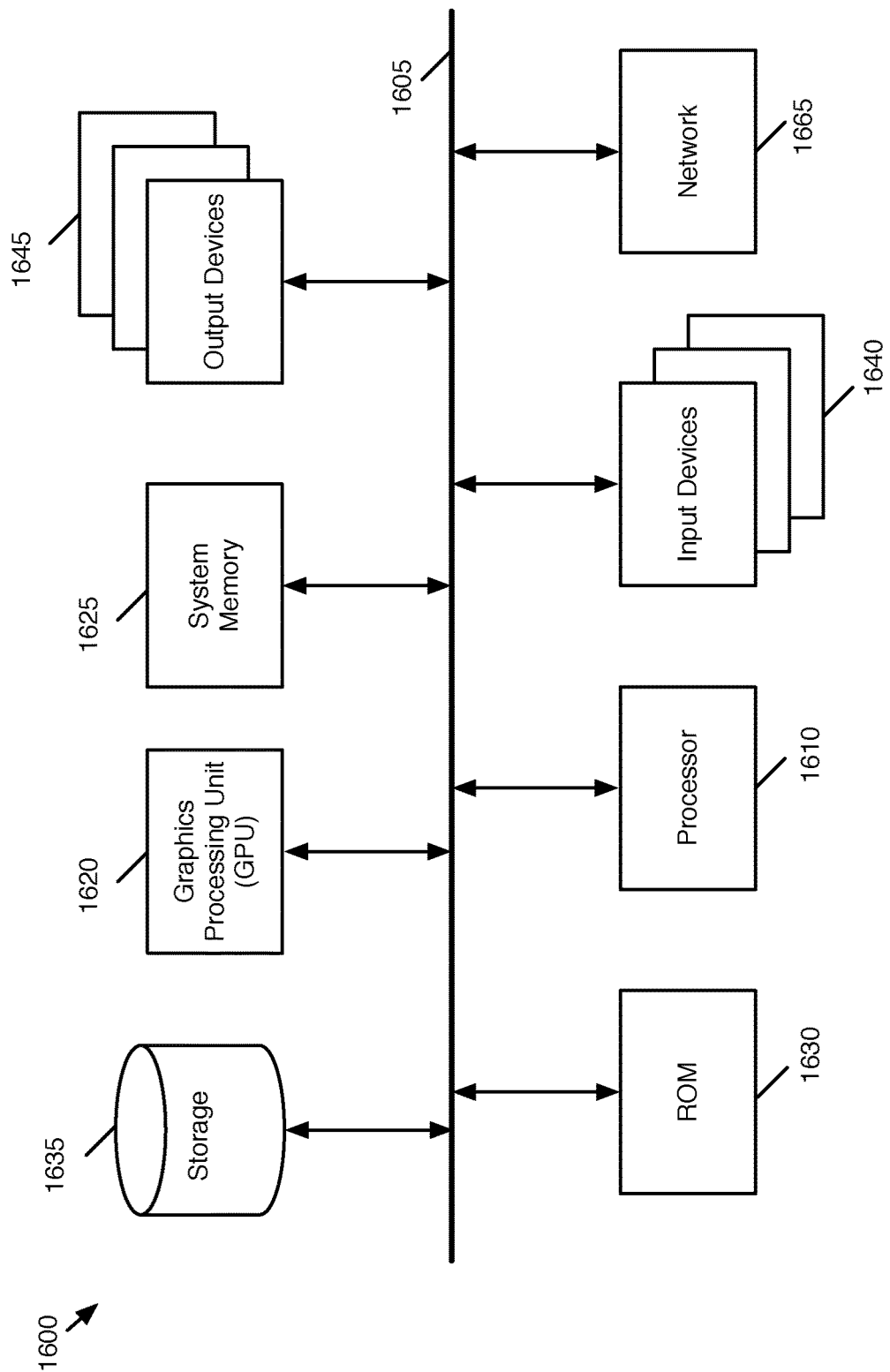
FIG. 16 conceptually illustrates an electronic system with which some embodiments of the invention are implemented.

FIG. 16 conceptually illustrates an electronic system 1600 with which some embodiments of the invention are implemented. The electronic system 1600 may be a computer (e.g., a desktop computer, personal computer, tablet computer, etc.), server, dedicated switch, phone, PDA, or any other sort of electronic or computing device. Such an electronic system includes various types of computer readable media and interfaces for various other types of computer readable media. Electronic system 1600 includes a bus 1605, processing unit(s) 1610, a system memory 1625, a read-only memory 1630, a permanent storage device 1635, input devices 1640, and output devices 1645.

The bus 1605 collectively represents all system, peripheral, and chipset buses that communicatively connect the numerous internal devices of the electronic system 1600. For instance, the bus 1605 communicatively connects the processing unit(s) 1610 with the read-only memory 1630, the system memory 1625, and the permanent storage device 1635.

From these various memory units, the processing unit(s) 1610 retrieves instructions to execute and data to process in order to execute the processes of the invention. The processing unit(s) may be a single processor or a multi-core processor in different embodiments.

The read-only-memory (ROM) 1630 stores static data and instructions that are needed by the processing unit(s) 1610 and other modules of the electronic system. The permanent storage device 1635, on the other hand, is a read-and-write memory device. This device is a non-volatile memory unit that stores instructions and data even when the electronic system 1600 is off. Some embodiments of the invention use a mass-storage device (such as a magnetic or optical disk and its corresponding disk drive) as the permanent storage device 1635.

Other embodiments use a removable storage device (such as a floppy disk, flash memory device, etc., and its corresponding drive) as the permanent storage device. Like the permanent storage device 1635, the system memory 1625 is a read-and-write memory device. However, unlike storage device 1635, the system memory 1625 is a volatile read-and-write memory, such a random access memory. The system memory 1625 stores some of the instructions and data that the processor needs at runtime. In some embodiments, the invention's processes are stored in the system memory 1625, the permanent storage device 1635, and/or the read-only memory 1630. From these various memory units, the processing unit(s) 1610 retrieves instructions to execute and data to process in order to execute the processes of some embodiments.

The bus 1605 also connects to the input and output devices 1640 and 1645. The input devices 1640 enable the user to communicate information and select commands to the electronic system. The input devices 1640 include alpha-numeric keyboards and pointing devices (also called "cursor control devices"), cameras (e.g., webcams), microphones or similar devices for receiving voice commands, etc. The output devices 1645 display images generated by the electronic system or otherwise output data. The output devices 1645 include printers and display devices, such as cathode ray tubes (CRT) or liquid crystal displays (LCD), as well as speakers or similar audio output devices. Some embodiments include devices such as a touchscreen that function as both input and output devices.

Finally, as shown in FIG. 16, bus 1605 also couples electronic system 1600 to a network 1665 through a network adapter (not shown). In this manner, the computer can be a part of a network of computers (such as a local area network ("LAN"), a wide area network ("WAN"), or an Intranet, or a network of networks, such as the Internet. Any or all components of electronic system 1600 may be used in conjunction with the invention.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the above discussion primarily refers to microprocessor or multi-core processors that execute software, some embodiments are performed by one or more integrated circuits, such as application specific integrated circuits (ASICs) or field programmable gate arrays (FPGAs). In some embodiments, such integrated circuits execute instructions that are stored on the circuit itself. In addition, some embodiments execute software stored in programmable logic devices (PLDs), ROM, or RAM devices.

As used in this specification and any claims of this application, the terms "computer", "server", "processor", and "memory" all refer to electronic or other technological devices. These terms exclude people or groups of people. For the purposes of the specification, the terms display or displaying means displaying on an electronic device. As used in this specification and any claims of this application, the terms "computer readable medium," "computer readable media," and "machine readable medium" are entirely restricted to tangible, physical objects that store information in a form that is readable by a computer. These terms exclude any wireless signals, wired download signals, and any other ephemeral signals.

This specification refers throughout to computational and network environments that include virtual machines (VMs). However, virtual machines are merely one example of data compute nodes (DCNs) or data compute end nodes, also referred to as addressable nodes. DCNs may include non-virtualized physical hosts, virtual machines, containers that run on top of a host operating system without the need for a hypervisor or separate operating system, and hypervisor kernel network interface modules.

VMs, in some embodiments, operate with their own guest operating systems on a host using resources of the host virtualized by virtualization software (e.g., a hypervisor, virtual machine monitor, etc.). The tenant (i.e., the owner of the VM) can choose which applications to operate on top of the guest operating system. Some containers, on the other hand, are constructs that run on top of a host operating system without the need for a hypervisor or separate guest operating system. In some embodiments, the host operating system uses name spaces to isolate the containers from each other and therefore provides operating-system level segregation of the different groups of applications that operate within different containers. This segregation is akin to the VM segregation that is offered in hypervisor-virtualized environments that virtualize system hardware, and thus can be viewed as a form of virtualization that isolates different groups of applications that operate in different containers. Such containers are more lightweight than VMs.

Hypervisor kernel network interface modules, in some embodiments, is a non-VM DCN that includes a network stack with a hypervisor kernel network interface and receive/transmit threads. One example of a hypervisor kernel network interface module is the vmknic module that is part of the ESXi™ hypervisor of VMware, Inc.

It should be understood that while the specification refers to VMs, the examples given could be any type of DCNs, including physical hosts, VMs, non-VM containers, and hypervisor kernel network interface modules. In fact, the example networks could include combinations of different types of DCNs in some embodiments.

The term "packet" is used throughout this application to refer to a collection of bits in a particular format sent across a network. It should be understood that the term "packet" may be used herein to refer to various formatted collections of bits that may be sent across a network. A few examples of such formatted collections of bits are Ethernet frames, TCP segments, UDP datagrams, IP packets, etc.

While the invention has been described with reference to numerous specific details, one of ordinary skill in the art will recognize that the invention can be embodied in other specific forms without departing from the spirit of the invention. Thus, one of ordinary skill in the art would understand that the invention is not to be limited by the foregoing illustrative details, but rather is to be defined by the appended claims.

We claim:

1. A method for performing a multi-point capture of packets in a network, the method comprising:
   identifying a plurality of nodes for the multi-point capture in the network;
   configuring each node of the plurality of nodes to capture a set of packets by identifying a staggered start time by exchanging a number of packets with each node and computing a round-trip time for each node based on the exchanged packets for each node, wherein each node waits for the staggered start time before beginning a capture;

receiving a plurality of captured packet sets from the plurality of nodes; and analyzing the plurality of captured packet sets.

2. The method of claim 1 further comprising receiving a configuration for the capture from an administrator of the network.

3. The method of claim 2, wherein the configuration comprises a packet filter, wherein configuring each node comprises configuring the node to only capture packets that match the packet filter.

4. The method of claim 3, wherein the packet filter identifies a source node and a destination node, wherein identifying the plurality of nodes comprises identifying a set of paths between the source node and the destination node.

5. The method of claim 2, wherein the configuration comprises a packet constraint, wherein each node is configured to only capture a portion of each packet, wherein the captured portion is defined by the packet constraint.

6. The method of claim 2 further comprising monitoring for events occurring in the network, wherein identifying the configuration is performed upon detecting a particular event.

7. The method of claim 1, wherein identifying the plurality of nodes is based on a network topology defined for the network.

8. The method of claim 7, wherein the network is a logical network, wherein the network topology is defined as a mapping of nodes of the logical network to nodes of the physical network.

9. The method of claim 8, wherein the identified plurality of nodes is from the logical network, wherein configuring each node of the plurality of nodes comprises:

based on the mapping of the network topology, identifying a corresponding node from the physical network; and configuring the corresponding node from the physical network.

10. The method of claim 1, wherein the plurality of nodes comprises a first node on a first physical machine and a second node on a different second physical machine.

11. The method of claim 1, wherein the plurality of nodes comprises a first node and a second node on a same physical machine.

12. The method of claim 11, wherein the first and second nodes operate at different layers of a network stack operating on the physical machine.

13. The method of claim 1, wherein configuring each node comprises identifying a staggered start time for each node, wherein each node waits for the staggered start time before beginning a capture.

14. A method for performing a multi-point capture of packets in a network, the method comprising:

receiving a configuration for the capture from an administrator of the network, wherein the configuration for the capture comprises a session length;

identifying a plurality of nodes for the multi-point capture in the network;

configuring each node of the plurality of nodes to capture a set of packets by identifying a batch duration based on the session length and a set of properties of the particular node;

receiving a plurality of captured packet sets from the plurality of nodes by receiving a plurality of subsets of the set of captured packets, wherein each subset comprises packets captured during the batch duration; and analyzing the plurality of captured packet sets.

15. The method of claim 14, wherein the set of properties of the particular node comprises an amount of memory.

16. A method for performing a multi-point capture of packets in a network, the method comprising:

identifying a plurality of nodes for the multi-point capture in the network;

configuring each node of the plurality of nodes to capture a set of packets by identifying a staggered start time for each node, wherein each node waits for the staggered start time before beginning a capture, wherein identifying the staggered start time for a particular node comprises identifying the staggered start time based on previous communications with the particular node;

receiving a plurality of captured packet sets from the plurality of nodes; and analyzing the plurality of captured packet sets.

17. A non-transitory machine readable medium storing a program which when executed by at least one processing unit performs a multi-point capture of packets in a network, the program comprising sets of instructions for:

receiving a configuration for the multi-point capture from an administrator of the network, wherein the configuration for the capture comprises a session length;

identifying a plurality of nodes for the multi-point capture in the network;

configuring each node of the plurality of nodes to capture a set of packets by identifying a batch duration based on the session length and a set of properties of the particular node;

receiving, from the plurality of nodes, a plurality of captured packet sets comprising subsets of the set of captured packets, wherein each subset comprises packets captured during the batch duration; and analyzing the plurality of captured packet sets.

18. The non-transitory machine readable medium of claim 17, wherein:

the configuration further comprises a packet filter that identifies a source node and a destination node;

the set of instructions for identifying the plurality of nodes comprises a set of instructions for identifying a set of paths between the source node and the destination node; and the set of instructions for configuring each node comprises a set of instructions for configuring the node to only capture packets that match the packet filter.

19. The non-transitory machine readable medium of claim 17, wherein:

the configuration further comprises a packet constraint;

each node is configured to only capture a portion of each packet; and the captured portion is defined by the packet constraint.

20. The non-transitory machine readable medium of claim 17, wherein the set of instructions for configuring each node comprises a set of instructions for identifying a staggered start time for each node, wherein each node waits for the staggered start time before beginning a capture.

21. A non-transitory machine readable medium storing a program which when executed by at least one processing unit performs a multi-point capture of packets in a network, the program comprising sets of instructions for:

identifying a plurality of nodes for the multi-point capture in the network;

configuring each node of the plurality of nodes to capture a set of packets by identifying a staggered start time for each node, wherein each node waits for the staggered start time before beginning a capture, the identified staggered start time for at least one particular node identified by exchanging a number of packets with each node and computing a round-trip time for each node based on the exchanged packets;

receiving a plurality of captured packet sets from the plurality of nodes; and analyzing the plurality of captured packet sets.

22. A non-transitory machine readable medium storing a program which when executed by at least one processing unit performs a multi-point capture of packets in a network, the program comprising sets of instructions for:

identifying a plurality of nodes for the multi-point capture in the network;

configuring each node of the plurality of nodes to capture a set of packets by identifying a staggered start time for each node, wherein each node waits for the staggered start time before beginning a capture, the identified staggered start time for at least one particular node identified based on previous communications with the particular node;

receiving a plurality of captured packet sets from the plurality of nodes; and analyzing the plurality of captured packet sets.

* * * * *